United States Patent
Takimoto et al.

(10) Patent No.: US 9,499,694 B2
(45) Date of Patent: Nov. 22, 2016

(54) POLYCARBONATE RESIN COMPOSITION AND MOLDED ARTICLE

(71) Applicant: IDEMITSU KOSAN CO., LTD., Chiyoda-ku (JP)

(72) Inventors: Masami Takimoto, Chiba (JP); Yasuhiro Ishikawa, Chiba (JP); Yusuke Aoki, Chiba (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 69 days.

(21) Appl. No.: 14/372,100

(22) PCT Filed: Jan. 29, 2013

(86) PCT No.: PCT/JP2013/051902
§ 371 (c)(1),
(2) Date: Jul. 14, 2014

(87) PCT Pub. No.: WO2013/115182
PCT Pub. Date: Aug. 8, 2013

(65) Prior Publication Data
US 2014/0343200 A1 Nov. 20, 2014

(30) Foreign Application Priority Data
Jan. 30, 2012 (JP) .................. 2012-017046

(51) Int. Cl.
| | | |
|---|---|---|
| C08L 69/00 | (2006.01) | |
| C08K 5/1515 | (2006.01) | |
| C08K 5/49 | (2006.01) | |
| C08K 5/50 | (2006.01) | |
| C08K 5/526 | (2006.01) | |
| C08G 64/18 | (2006.01) | |

(52) U.S. Cl.
CPC .............. *C08L 69/00* (2013.01); *C08K 5/1515* (2013.01); *C08K 5/50* (2013.01); *C08K 5/526* (2013.01); *C08L 2205/02* (2013.01); *C08L 2205/025* (2013.01)

(58) Field of Classification Search
CPC ................... C08G 64/18; C08G 64/186; C08L 69/00; C08K 5/1515; C08K 5/50; C08K 5/526
See application file for complete search history.

(56) References Cited

U.S. PATENT DOCUMENTS

| | | | | | |
|---|---|---|---|---|---|
| 5,403,878 | A | * | 4/1995 | Ishiwa ................. | C08L 69/00 524/158 |
| 5,530,083 | A | * | 6/1996 | Phelps ................. | C08G 64/186 525/464 |
| 6,476,178 | B1 | * | 11/2002 | Mitsuta ................. | C08K 3/0008 528/196 |
| 2003/0158371 | A1 | * | 8/2003 | Akamine ............... | C08G 71/04 528/196 |
| 2006/0089434 | A1 | | 4/2006 | Nodera | |
| 2006/0263545 | A1 | | 11/2006 | Coenjarts et al. | |
| 2006/0263546 | A1 | | 11/2006 | Gurel et al. | |
| 2006/0263547 | A1 | | 11/2006 | Cojocariu et al. | |
| 2007/0037906 | A1 | * | 2/2007 | Kawato .................... | C08K 5/50 524/154 |
| 2007/0218293 | A1 | | 9/2007 | Kawato et al. | |
| 2008/0113117 | A1 | | 5/2008 | Coenjarts et al. | |
| 2008/0128928 | A1 | | 6/2008 | Cojocariu et al. | |
| 2008/0176978 | A1 | | 7/2008 | Nodera | |
| 2009/0116115 | A1 | | 5/2009 | Kogure et al. | |
| 2009/0186208 | A1 | | 7/2009 | Ishikawa et al. | |
| 2009/0239983 | A1 | | 9/2009 | Nodera et al. | |
| 2010/0048779 | A1 | | 2/2010 | Hayata | |
| 2012/0108739 | A1 | | 5/2012 | Ishikawa et al. | |
| 2013/0082222 | A1 | | 4/2013 | Aoki | |

FOREIGN PATENT DOCUMENTS

| | | |
|---|---|---|
| CN | 101023135 A | 8/2007 |
| CN | 101044205 A | 9/2007 |
| CN | 102119191 A | 7/2011 |
| EP | 1 471 114 A1 | 10/2004 |
| EP | 2 113 533 A1 | 11/2009 |

(Continued)

OTHER PUBLICATIONS

Combined Office Action and Search Report issued Aug. 5, 2015 in Chinese Patent Application No. 201380006938.8 (with English Translation of Category of Cited Documents).

(Continued)

*Primary Examiner* — Brieann R Fink
(74) *Attorney, Agent, or Firm* — Oblon, McClelland, Maier & Neustadt, L.L.P.

(57) ABSTRACT

Provided is a polycarbonate resin composition including, with respect to 100 parts by mass of an aromatic polycarbonate resin mixture (A) consisting of 5 to 100 mass % of an aromatic polycarbonate-polyorganosiloxane copolymer (A-1) and 95 to 0 mass % of an aromatic polycarbonate resin (A-2) except the component (A-1), the aromatic polycarbonate resin mixture (A) having a content of a polyorganosiloxane unit is 1 mass % or more, 0.002 to 0.200 parts by mass of a phosphorus-based antioxidant (B) and 0 to 0.200 parts by mass of an epoxidation stabilizer (C), in which a reduction ratio P between the viscosity-average molecular weights of the resin composition before and after a pressure cooker test calculated from the calculation equation (I) is 20% or less. The polycarbonate resin composition can be a material for a molded body capable of maintaining its excellent impact-resisting performance at low temperatures for a long time period even when repeatedly used under a high-temperature and high-humidity environment, and its discoloration or the like hardly occurs even when the resin composition is retained at high temperatures.

14 Claims, No Drawings

(56) References Cited

FOREIGN PATENT DOCUMENTS

| | | |
|---|---|---|
| JP | 2006 188651 | 7/2006 |
| JP | 2007 302793 | 11/2007 |
| JP | 2008 540808 | 11/2008 |
| JP | 2009 280725 | 12/2009 |
| JP | 2010 215791 | 9/2010 |
| TW | 200632030 A | 9/2006 |
| TW | 201009014 A1 | 3/2010 |
| WO | WO 2011/155490 A1 | 12/2011 |
| WO | 2012 056971 | 5/2012 |

OTHER PUBLICATIONS

Office Action issued Jul. 20, 2015 in European Patent Application No. 13743838.8.

International Search Report Issued Apr. 16, 2013 in PCT/JP13/051902 Filed Jan. 29, 2013.

Combined Taiwanese Office Action and Search Report issued on Mar. 18, 2016 in Patent Application No. 102103560 (with English language translation of categories of cited documents).

\* cited by examiner

POLYCARBONATE RESIN COMPOSITION AND MOLDED ARTICLE

CROSS REFERENCE TO RELATED APPLICATION

This application is a 371 of PCT/JP2013/051902, filed on Jan. 29, 2013, and claims priority to Japanese Patent Application No. 2012-017046, filed on Jan. 30, 2012.

TECHNICAL FIELD

The present invention relates to a polycarbonate resin composition and a molded article obtained by molding the resin composition.

BACKGROUND ART

For example, such an aromatic polycarbonate resin composition containing an aromatic polycarbonate-polyorganosiloxane copolymer (hereinafter sometimes referred to as "PC-POS copolymer") as disclosed in Patent Document 1 has high suitability as a material for a molded article to be used in low-temperature applications because the resin composition is a material excellent in impact resistance under a low-temperature environment.

Meanwhile, logistic articles and containers to be used in a refrigerated warehouse and the like are often washed with hot water or high-temperature steam before being placed in a low-temperature warehouse, and hence the logistic articles and containers are each required to have not only impact-resisting performance under a low-temperature environment but also performance to resist a high-temperature and high-humidity environment.

CITATION LIST

Patent Documents

[Patent Document 1] JP 2010-215791 A

SUMMARY OF INVENTION

Technical Problem

Although a molded article obtained by molding a polycarbonate resin composition containing a PC-POS copolymer is excellent in impact resistance under a low-temperature environment, the article involves a problem in that its impact-resisting performance at low temperatures reduces as the article is repeatedly used under a high-temperature and high-humidity environment. For example, when logistic articles and containers, which are to be used in a refrigerated warehouse while being repeatedly subjected to, for example, washing with hot water or steam, are each produced by using the polycarbonate resin composition containing the PC-POS copolymer, the low-temperature impact performance of the product reduces as the washing with hot water or steam, or the like is repeated. As a result, the logistic articles and containers may break during their conveyance or refrigeration storage. Accordingly, it has been pointed out that the containers each formed of the polycarbonate resin composition containing the PC-POS copolymer are not suitable for such applications that the containers are repeatedly washed and used under a high-temperature and high-humidity environment.

Accordingly, there has been a demand for a polycarbonate resin composition that can be a material for a molded body capable of maintaining its impact-resisting performance at low temperatures for a long time period even when repeatedly washed with hot water or steam.

The present invention has been made in view of the problems, and an object of the present invention is to provide the following polycarbonate resin composition and a molded body obtained by molding the resin composition. The resin composition can be a material for a molded body capable of maintaining its high low-temperature impact-resisting performance for a long time period even when repeatedly used under a high-temperature and high-humidity environment. In addition, the resin composition has such processing stability that its discoloration or the like hardly occurs even when the resin composition is retained in an injection molding machine.

Solution to Problem

The inventors of the present invention have found that a reduction in molecular weight of a polycarbonate resin is a cause for the fact that a molded article obtained by molding a polycarbonate resin composition containing a PC-POS copolymer is reduced in impact-resisting performance at low temperatures as the article is repeatedly used under a high-temperature and high-humidity environment.

Further, the inventors of the present invention have assumed that although the reduction in molecular weight can be caused by the hydrolysis of the polycarbonate resin itself, the reduction in molecular weight of the polycarbonate resin is promoted not so much by the hydrolysis as by an influence of a decomposition product (such as phosphorous acid) produced by the hydrolysis of a phosphorus-based antioxidant added to the resin composition.

To verify the assumption, the inventors of the present invention have subjected a flat sample produced by using a polycarbonate resin composition of a specific formulation containing the PC-POS copolymer to a pressure cooker test under a predetermined condition and then have performed an automatic falling weight impact test under a predetermined condition to grasp a relationship between a reduction in impact resistance of the flat sample and the molecular weight, and to search for such a condition that the sample do not brittlely fracture.

As a result, the inventors of the present invention have found that the problems can be solved by using the following polycarbonate resin composition. With respect to a specific content of a phosphorus-based antioxidant to be incorporated into the resin composition together with the PC-POS copolymer, an epoxidation stabilizer capable of suppressing the hydrolysis of the phosphorus-based antioxidant is incorporated in a specific amount to adjust a reduction ratio between the viscosity-average molecular weights of the resin composition before and after the pressure cooker test to a specific value or less. Thus, the inventors have completed the present invention.

That is, the present invention provides the following items (1) to (11).

(1) A polycarbonate resin composition, including, with respect to 100 parts by mass of an aromatic polycarbonate resin mixture (A) consisting of 5 to 100 mass % of an aromatic polycarbonate-polyorganosiloxane copolymer (A-1) and 95 to 0 mass % of an aromatic polycarbonate resin (A-2) except the component (A-1), the aromatic polycarbonate resin mixture (A) having a content of a polyorganosiloxane unit is 1 mass % or more, 0.002 to 0.200 parts by mass of a phosphorus-based antioxidant (B) and 0 to 0.200 parts by mass of an epoxidation stabilizer (C), in which a reduction ratio P of a viscosity-average molecular weight of the polycarbonate resin composition calculated from the following calculation equation (I) is 20% or less:

$$P\, [\%] = (M_1 - M_2)/M_1 \times 100 \qquad \text{calculation equation (I):}$$

in the equation (I), $M_1$ represents a viscosity-average molecular weight of the polycarbonate resin composition measured after the resin composition is pelletized, $M_2$ represents a viscosity-average molecular weight of the resin composition after a pressure cooker test measured after the pellet is loaded into a pressure cooker tester set to 121° C. and is treated for 300 hours, and P represents the reduction ratio of the viscosity-average molecular weight of the resin composition after the pressure cooker test to the viscosity-average molecular weight of the resin composition before the test.

(2) The polycarbonate resin composition according to the above-mentioned item (1), in which the viscosity-average molecular weight of the resin composition after the pressure cooker test represented by the $M_2$ in the calculation equation (I) is 16,000 or more.

(3) The polycarbonate resin composition according to the above-mentioned item (1) or (2), in which the phosphorus-based antioxidant (B) is a phosphite-based antioxidant or a phosphine-based antioxidant.

(4) The polycarbonate resin composition according to any one of the above-mentioned items (1) to (3), in which when the phosphorus-based antioxidant (B) is a phosphite-based antioxidant and the resin composition is substantially free of the component (C), a content of the phosphite-based antioxidant as the component (B) is 0.002 parts by mass or more and less than 0.020 parts by mass with respect to 100 parts by mass of the component (A).

(5) The polycarbonate resin composition according to any one of the above-mentioned items (1) to (3), in which when the phosphorus-based antioxidant (B) is a phosphite-based antioxidant and a content of the phosphite-based antioxidant as the component (B) with respect to 100 parts by mass of the component (A) is from 0.020 to 0.200 parts by mass, a content of the component (C) with respect to 100 parts by mass of the component (A) is more than 0 parts by mass and 0.200 parts by mass or less.

(6) The polycarbonate resin composition according to any one of the above-mentioned items (1) to (3), in which when the phosphorus-based antioxidant (B) is a phosphine-based antioxidant, the resin composition is substantially free of the component (C).

(7) The polycarbonate resin composition according to any one of the above-mentioned items (1) to (3), in which the epoxidation stabilizer (C) includes one or more kinds selected from 3,4-epoxycyclohexenylmethyl-3',4'-epoxycyclohexene carboxylate and a 1,2-epoxy-4-(2-oxiranyl)cyclohexane adduct of 2,2-bis(hydroxymethyl)-1-butanol.

(8) The polycarbonate resin composition according to any one of the above-mentioned items (1) to (3), in which the epoxidation stabilizer (C) is an epoxidized natural oil having an oxirane oxygen concentration of 4% or more, or an epoxidized synthetic oil having an oxirane oxygen concentration of 4% or more.

(9) A molded article, which is obtained by molding the polycarbonate resin composition according to any one of the above-mentioned items (1) to (8).

(10) The molded article according to the above-mentioned item (9), in which the molded article is a product or part to be washed with at least one of hot water at 90° C. or more and steam at 100° C. or more.

(11) The molded article according to the above-mentioned item (9) or (10), in which the molded article is a product or part to be used under an environment having a temperature of 60° C. or more and a relative humidity of 90% or more.

Advantageous Effects of Invention

The polycarbonate resin composition of the present invention contains a moderate amount of the antioxidant, and hence the discoloration or the like of the resin composition hardly occurs even when the resin composition is retained in an injection molding machine. Meanwhile, a molded body molded out of the resin composition can maintain its excellent low-temperature impact-resisting performance over a long time period even when the molded body contains a phosphite-based antioxidant or the like that is liable to hydrolyze, and even when the molded body is repeatedly used under a high-temperature and high-humidity environment.

DESCRIPTION OF EMBODIMENTS

Polycarbonate Resin Composition

A polycarbonate resin composition (hereinafter sometimes simply referred to as "resin composition") of the present invention is a polycarbonate resin composition containing, with respect to 100 parts by mass of an aromatic polycarbonate resin mixture (A) formed of an aromatic polycarbonate-polyorganosiloxane copolymer (A-1) (hereinafter sometimes referred to as "PC-POS copolymer (A-1)") and an aromatic polycarbonate resin (A-2) except the component (A-1) (hereinafter sometimes referred to as "other PC resin (A-2)") to be blended as required, 0.002 to 0.200 parts by mass of a phosphorus-based antioxidant (B) and 0 to 0.200 parts by mass of an epoxidation stabilizer (C).

The resin composition of the present invention has the following feature.

That is, the resin composition of the present invention is such a polycarbonate resin composition that a reduction ratio P of the viscosity-average molecular weight of the polycarbonate resin composition calculated from the following calculation equation (I) is 20% or less, preferably 18% or less, more preferably 16% or less.

$$P\, [\%] = (M_1 - M_2)/M_1 \times 100 \qquad \text{Calculation equation (I):}$$

In the equation (I), $M_1$ represents the viscosity-average molecular weight of the polycarbonate resin composition measured after the resin composition is pelletized, $M_2$ represents the viscosity-average molecular weight of the resin composition after a pressure cooker test measured after the pellet is loaded into a pressure cooker tester set to 121° C. and is treated for 300 hours, and P represents the reduction ratio of the viscosity-average molecular weight of the resin composition after the pressure cooker test to the viscosity-average molecular weight of the resin composition before the test.

It should be noted that the pellet in the present invention is obtained by melting and/or kneading the resin composition of the present invention with an extruder or the like, and then processing the resultant into a granular shape having an average representative length of from about 0.1 to 20 mm.

A value for the P calculated from the calculation equation (I) represents the ratio at which the viscosity-average molecular weight of the resin composition of the present invention reduces owing to its hydrolysis after the resin composition is kneaded to be pelletized (and turned into a molded article), and the pellet or molded article is subjected to a pressure cooker test (hereinafter sometimes referred to as "PCT") at 121° C. for 300 hours.

Even when a molded body obtained by molding such resin composition is repeatedly used under a high-temperature and high-humidity environment such as steam washing or hot water washing, a reduction in molecular weight of the resin composition constituting the molded body due to its hydrolysis is small, and hence a molded body showing a small reduction in low-temperature impact performance and having high safety is obtained. Accordingly, the loading molecular weight of the resin composition can be reduced and such flowability that the resin composition can be easily processed into a molded body is obtained.

It should be noted that a lower value for the P calculated from the calculation equation (I) means that the durability of the resin composition under a high-temperature and high-humidity environment becomes higher, and a lower limit for the value is not particularly limited.

On the other hand, as a molded body molded out of such a resin composition that the reduction ratio P of its viscosity-average molecular weight exceeds 20% as a result of the test is repeatedly subjected to, for example, steam washing or hot water washing, the molecular weight of the resin of the molded body reduces and the impact-resisting performance of the molded body acceleratingly reduces. In such case, the risk of the fracture of the molded body under a low-temperature environment increases. The initial molecular weight of the resin composition needs to be considerably increased for compensating for the reduction in low-temperature impact performance of the molded body in association with the reduction in molecular weight of the resin composition. However, increasing the molecular weight reduces the moldability of the resin composition, and hence it is liable to be difficult to process the resin composition into a large molded body. In addition, when the molecular weight of the resin composition reduces, the mechanical properties of the molded body to be obtained such as a tensile characteristic, a bending characteristic, and a creep characteristic also reduce, and hence its strength against a static load such as stacking is liable to be insufficient. Further, when the molecular weight of the resin composition reduces, the whitening of the molded body to be obtained, the bleeding of an additive, or the like is liable to occur, and hence the external appearance of the molded body deteriorates.

In addition, the viscosity-average molecular weight of the resin composition after the pressure cooker test represented by the $M_2$ in the calculation equation (I) is preferably 16,000 or more, more preferably 17,000 or more, still more preferably 18,000 or more. When the viscosity-average molecular weight is 16,000 or more, the resin composition is applicable as a material for, for example, a logistic article or container for a refrigerated warehouse to be subjected to steam washing or the like. It should be noted that there is substantially no possibility that a molded body obtained by processing such a resin composition that the viscosity-average molecular weight after the pressure cooker test becomes 18,000 or more brittlely fractures even when exposed to severe impact. For example, even when such twenty 2-mm thick test plates as described in Examples are molded out of the resin composition and subjected to a pressure cooker test at 121° C. for 300 hours, and then an automatic falling weight impact test is performed at −30° C., all test plates undergo ductile fracture.

Although an upper limit for the viscosity-average molecular weight of the resin composition after the PCT is not particularly limited, the viscosity-average molecular weight is typically 80,000 or less, preferably 60,000 or less.

Such resin composition achieving compatibility between hydrolysis-resisting performance and low-temperature impact property as described above is achieved by the following construction.

<Aromatic Polycarbonate Resin Mixture (A)>

The resin composition contains the resin mixture (A) formed of the PC-POS copolymer (A-1) and the other PC resin (A-2).

The content of the PC-POS copolymer (A-1) is from 5 to 100 mass %, preferably from 20 to 95 mass %, more preferably from 35 to 93 mass %, still more preferably from 50 to 90 mass % with respect to the total amount of the component (A).

Meanwhile, the content of the PC resin (A-2) to be blended as required is from 0 to 95 mass %, preferably from 5 to 80 mass %, more preferably from 7 to 65 mass %, still more preferably from 10 to 50 mass % with respect to the total amount of the component (A).

Further, the content of a polyorganosiloxane unit in the total amount of the component (A) is 1 mass % or more, preferably from 1 to 35 mass %, more preferably from 1.5 to 30 mass %, still more preferably from 2 to 20 mass %, still more preferably from 3 to 15 mass %.

When the content of the polyorganosiloxane unit is less than 1 mass %, the impact-resisting performance of the resin composition under a low-temperature environment does not reach the level of low-temperature impact performance required of, for example, a material for logistic articles and containers to be used in a refrigerated warehouse or the like having an atmosphere at −30° C. or less.

With regard to a molecular weight upon loading at the time of the production of the resin composition, a viscosity-average molecular weight upon loading of the resin composition (the viscosity-average molecular weight of the resin composition before the PCT) is not particularly limited as long as the composition is such that the content of the polyorganosiloxane unit in the total amount of the component (A) is 1 mass % or more and the reduction ratio P of its viscosity-average molecular weight after the pressure cooker test is 20% or less.

The viscosity-average molecular weight of the resin composition before the PCT is typically 80,000 or less, preferably from 10,000 to 80,000, more preferably from 16,000 to 60,000.

Hereinafter, the component (A-1) and the component (A-2) are described in detail.

(PC-POS Copolymer (A-1))

The PC-POS copolymer (A-1) in the resin composition of the present invention is preferably a copolymer containing a polycarbonate moiety (PC moiety) formed of a constituent unit represented by the following general formula (I) and a polyorganosiloxane moiety (POS moiety) formed of a constituent unit represented by the following general formula (II).

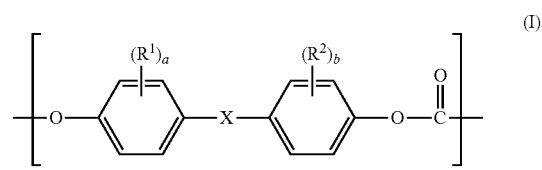

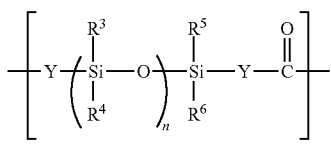

In the general formula (I), $R^1$ and $R^2$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —SO$_2$—, —O—, or —CO—, and a and b each independently represent an integer of from 0 to 4.

In addition, in the general formula (II), $R^3$ to $R^6$ each independently represent a hydrogen atom, a halogen atom, an alkyl group having 1 to 6 carbon atoms, an alkoxy group having 1 to 6 carbon atoms, or an aryl group having 6 to 12 carbon atoms, Y represents an organic residue containing an aliphatic or aromatic group, and n represents an average repetition number and represents a number of from 20 to 1,000.

Examples of the alkyl group which $R^1$ and $R^2$ in the general formula (I) each independently represent include a methyl group, an ethyl group, an n-propyl group, an isopropyl group, various butyl groups (the term "various" means that a linear group and every branched group are included, and the same holds true for the following), various pentyl groups, and various hexyl groups.

An example of the alkoxy group which $R^1$ and $R^2$ each independently represent is a group whose alkyl group moiety is the above-mentioned alkyl group.

Examples of the alkylene group represented by X include a methylene group, an ethylene group, a trimethylene group, a tetramethylene group, and a hexamethylene group. An alkylene group having 1 to 5 carbon atoms is preferred.

Examples of the alkylidene group represented by X include an ethylidene group and an isopropylidene group.

Examples of the cycloalkylene group represented by X include a cyclopentanediyl group, a cyclohexanediyl group, and a cyclooctanediyl group. A cycloalkylene group having 5 to 10 carbon atoms is preferred.

Examples of the cycloalkylidene group represented by X include a cyclohexylidene group, a 3,5,5-trimethylcyclohexylidene group, and a 2-adamantylidene group. A cycloalkylidene group having 5 to 10 carbon atoms is preferred, and a cycloalkylidene group having 5 to 8 carbon atoms is more preferred.

a and b each independently represent an integer of from 0 to 4, preferably from 0 to 2, more preferably 0 or 1.

Examples of the halogen atom which $R^3$ to $R^6$ in the general formula (II) each independently represent include a fluorine atom, a chlorine atom, a bromine atom, and an iodine atom.

Examples of the alkyl group or alkoxy group which $R^3$ to $R^6$ each independently represent include the same groups as those in the cases of $R^1$ and $R^2$.

Examples of the aryl group which $R^3$ to $R^6$ each independently represent include a phenyl group and a naphthyl group.

The organic residue including an aliphatic group represented by Y is, for example, an alkylene group having 1 to 10 carbon atoms (preferably 1 to 6 carbon atoms, more preferably 1 to 3 carbon atoms).

The organic residue including an aromatic group represented by Y is, for example, an arylene group having 6 to 12 ring-forming carbon atoms such as a phenylene group, a naphthylene group, or a biphenyldiyl group.

The average repetition number n of the POS moiety in the general formula (II) is from 20 to 1,000, preferably from 30 to 600, more preferably from 35 to 250, still more preferably from 40 to 150. When n represents 20 or more, the impact resistance of the resin composition at low temperatures can be sufficiently improved. In addition, when n represents 1,000 or less, no problem concerning the handleability of the POS arises, which is preferred from the viewpoint of the production of the PC-POS copolymer. It should be noted that a value for the average repetition number n is a value calculated by nuclear magnetic resonance (NMR) measurement.

The content of the constituent unit represented by the general formula (I) (PC moiety) is preferably from 70 to 98 mass %, more preferably from 85 to 97.5 mass %, still more preferably from 90 to 97 mass % in the PC-POS copolymer (A-1).

Meanwhile, the content of the constituent unit represented by the general formula (II) (POS moiety) is preferably from 1 to 30 mass %, more preferably from 2 to 20 mass %, still more preferably from 3 to 15 mass % in the PC-POS copolymer (A-1). When the content is 1 mass % or more, an improving effect on the impact strength of the resin composition is sufficient. Meanwhile, when the content is 30 mass % or less, the resin composition has sufficient heat resistance.

It should be noted that the content of each constituent unit in the PC-POS copolymer is a value calculated from nuclear magnetic resonance (NMR) measurement.

The viscosity-average molecular weight of the PC-POS copolymer (A-1) is preferably from 12,000 to 70,000, more preferably from 14,000 to 50,000, still more preferably from 16,000 to 30,000 from the viewpoint of a balance between the strength and productivity of a molded article.

The PC-POS copolymer having the constituent units represented by the general formulae (I) and (II) is preferably obtained by a production method involving copolymerizing a dihydric phenol represented by the following general formula (1), a polyorganosiloxane represented by the following general formula (2), and phosgene, a carbonate ester, or a chloroformate.

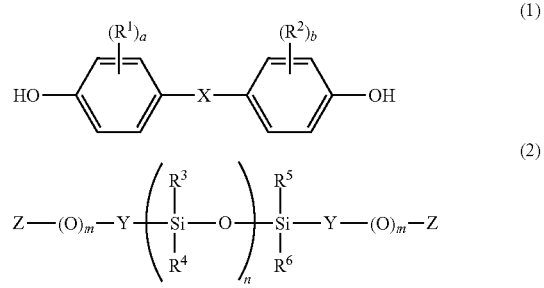

Here, in the general formula (1), $R^1$ and $R^2$, X, and a and b are identical to those of the general formula (I), and in the general formula (2), $R^3$ to $R^6$, Y, and n are identical to those of the general formula (II), m represents 0 or 1, Z represents a halogen, —$R^7$OH, —$R^7$COOH, —$R^7$NH$_2$, —COOH, or —SH, and $R^7$ represents a linear, branched, or cyclic alkylene group, an aryl-substituted alkylene group, an aryl-substituted alkylene group that may have an alkoxy group on a ring thereof, or an arylene group.

The dihydric phenol represented by the general formula (1) is not particularly limited, and is preferably 2,2-bis(4-hydroxyphenyl)propane (commonly called bisphenol A). When bisphenol A is used as the dihydric phenol, the PC-POS copolymer is such that in the general formula (I), X represents an isopropylidene group and a=b=0.

As a dihydric phenol other than bisphenol A, there are given, for example: bis(hydroxyaryl)alkanes such as bis(4-hydroxyphenyl)methane, 1,1-bis(4-hydroxyphenyl)ethane, 2,2-bis(4-hydroxyphenyl)butane, 2,2-bis(4-hydroxyphenyl)octane, bis(4-hydroxyphenyl)phenylmethane, bis(4-hydroxyphenyl)diphenylmethane, 2,2-bis(4-hydroxy-3-methylphenyl)propane, bis(4-hydroxyphenyl)naphthylmethane, 1,1-bis(4-hydroxy-t-butylphenyl)propane, 2,2-bis(4-hydroxy-3-bromophenyl)propane, 2,2-bis(4-hydroxy-3,5-dimethylphenyl)propane, 2,2-bis(4-hydroxy-3-chlorophenyl)propane, 2,2-bis(4-hydroxy-3,5-dichlorophenyl)propane, and 2,2-bis(4-hydroxy-3,5-dibromophenyl)propane; bis(hydroxyaryl)cycloalkanes such as 1,1-bis(4-hydroxyphenyl)cyclopentane, 1,1-bis(4-hydroxyphenyl)cyclohexane, 1,1-bis(4-hydroxyphenyl)-3,5,5-trimethylcyclohexane, 2,2-bis(4-hydroxyphenyl)norbornane, and 1,1-bis(4-hydroxyphenyl)cyclododecane; dihydroxyaryl ethers such as 4,4'-dihydroxydiphenyl ether and 4,4'-dihydroxy-3,3'-dimethylphenyl ether; dihydroxydiaryl sulfides such as 4,4'-dihydroxydiphenyl sulfide and 4,4'-dihydroxy-3,3'-dimethyldiphenyl sulfide; dihydroxydiaryl sulfoxides such as 4,4'-dihydroxydiphenyl sulfoxide and 4,4'-dihydroxy-3,3'-dimethyldiphenyl sulfoxide; dihydroxydiaryl sulfones such as 4,4'-dihydroxydiphenyl sulfone and 4,4'-dihydroxy-3,3'-dimethyldiphenyl sulfone; dihydroxydiphenyls such as 4,4'-dihydroxydiphenyl; dihydroxydiarylfluorenes such as 9,9-bis(4-hydroxyphenyl)fluorene and 9,9-bis(4-hydroxy-3-methylphenyl)fluorene; dihydroxydiaryladamantanes such as 1,3-bis(4-hydroxyphenyl)adamantane, 2,2-bis(4-hydroxyphenyl)adamantane, and 1,3-bis(4-hydroxyphenyl)-5,7-dimethyladamantane; 4,4'-[1,3-phenylenebis(1-methylethylidene)]bisphenol; 10,10-bis(4-hydroxyphenyl)-9-anthrone; and 1,5-bis(4-hydroxyphenylthio)-2,3-dioxapentane.

Those dihydric phenols may be used alone or as a mixture of two or more kinds thereof.

The polyorganosiloxane represented by the general formula (2) can be easily produced by subjecting a terminal of a polyorganosiloxane chain having a predetermined average repetition number n to a hydrosilylation reaction with a phenol having an olefinic unsaturated carbon-carbon bond, suitably vinylphenol, allylphenol, eugenol, isopropenylphenol, or the like. It is more preferred that the phenol be allylphenol or eugenol. In this case, Y in the general formula (II) represents an organic residue derived from allylphenol or eugenol.

Examples of the polyorganosiloxane represented by the general formula (2) include compounds represented by the following general formulae (3) to (11).

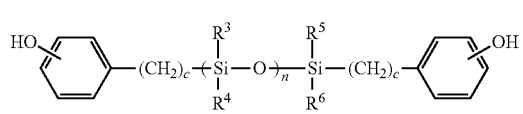
(3)

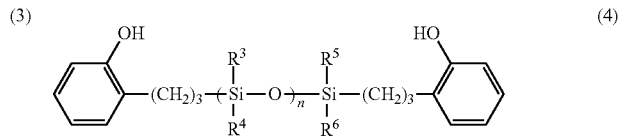
(4)

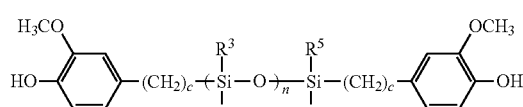
(5)

(6)

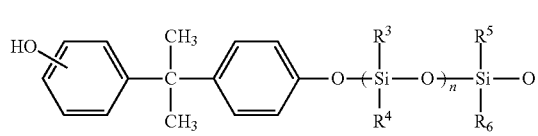
(7)

(8)

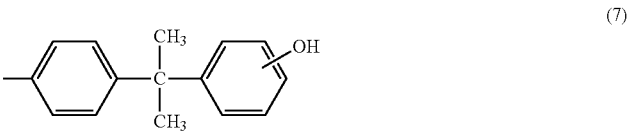
(9)

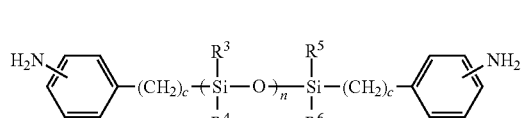
(10)

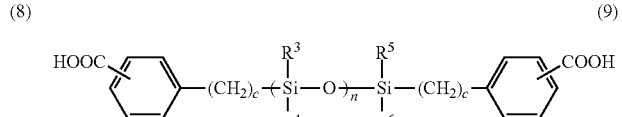
(11)

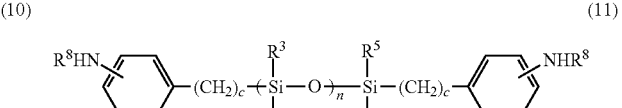

In the general formulae (3) to (11), $R^3$ to $R^6$ each independently represent a hydrogen atom, a halogen atom, an alkyl group having 1 to 6 carbon atoms, an alkoxy group having 1 to 6 carbon atoms, or an aryl group having 6 to 12 carbon atoms as in the general formula (II), n represents an average repetition number of organosiloxane constituent units and represents a number of from 20 to 1,000. In addition, $R^8$ represents an alkyl, alkenyl, aryl, or aralkyl group, and c's each independently represent a positive integer, typically an integer of from 2 to 6.

Of those, a phenol-modified polyorganosiloxane represented by the general formula (3) is preferred from the viewpoint of its ease of polymerization. In addition, an α,ω-bis[3-(o-hydroxyphenyl)propyl]polydimethylsiloxane as one kind of compounds represented by the general formula (4) or an α,ω-bis[3-(4-hydroxy-3-methoxyphenyl) propyl]polydimethylsiloxane as one kind of compounds represented by the general formula (5) is preferred from the viewpoint of its ease of availability.

The phenol-modified polyorganosiloxane can be produced by a known method. The production method is, for example, a method described below.

First, cyclotrisiloxane and disiloxane are caused to react with each other in the presence of an acid catalyst to synthesize an α,ω-dihydrogen organopolysiloxane. At this time, an α,ω-dihydrogen organopolysiloxane having a desired average repeating unit can be synthesized by changing a loading ratio between cyclotrisiloxane and disiloxane. Next, the α,ω-dihydrogen organopolysiloxane is subjected to an addition reaction with a phenol compound having an unsaturated aliphatic hydrocarbon group such as allylphenol or eugenol in the presence of a catalyst for a hydrosilylation reaction. Thus, the phenol-modified polyorganosiloxane having a desired average repeating unit can be produced.

In addition, at this stage, a low-molecular weight, cyclic polyorganosiloxane and an excess amount of the phenol compound remain as impurities. Accordingly, those low-molecular weight compounds are preferably removed by distillation through heating under reduced pressure.

(Other PC Resin (A-2))

The other PC resin (A-2) as the aromatic polycarbonate except the component (A-1) may be incorporated into the resin mixture (A).

Available as the other PC resin (A-2) is a resin obtained by a conventional production method for an aromatic polycarbonate such as: an interfacial polymerization method involving causing a dihydric phenol-based compound and phosgene to react with each other in the presence of an organic solvent and alkali aqueous solution inert to the reaction, and then adding a polymerization catalyst such as a tertiary amine or a quaternary ammonium salt to polymerize the resultant; or a pyridine method involving dissolving the dihydric phenol-based compound in pyridine or a mixed solution of pyridine and an inert solvent, and introducing phosgene into the solution to directly produce the resin.

Examples of the dihydric phenol-based compound to be used in the production of the aromatic polycarbonate as the component (A-2) include: bis(hydroxyaryl)alkanes such as 2,2-bis(4-hydroxyphenyl)propane (commonly called bisphenol A), bis(4-hydroxyphenyl)methane, 1,1-bis(4-hydroxyphenyl)ethane, 2,2-bis(4-hydroxyphenyl)butane, 2,2-bis(4-hydroxyphenyl)octane, bis(4-hydroxyphenyl) phenylmethane, bis(4-hydroxyphenyl)diphenylmethane, 2,2-bis(4-hydroxy-3-methylphenyl)propane, bis(4-hydroxyphenyl)naphthylmethane, 1,1-bis(4-hydroxy-3-t-butylphenyl)propane, 2,2-bis(4-hydroxy-3-bromophenyl)propane, 2,2-bis(4-hydroxy-3,5-dimethylphenyl)propane, 2,2-bis(4-hydroxy-3-chlorophenyl)propane, 2,2-bis(4-hydroxy-3,5-dichlorophenyl)propane, and 2,2-bis(4-hydroxy-3,5-dibromophenyl)propane; bis(hydroxyaryl)cycloalkanes such as 1,1-bis(4-hydroxyphenyl)cyclopentane, 1,1-bis(4-hydroxyphenyl)cyclohexane, 1,1-bis(4-hydroxyphenyl)-3,5,5-trimethylcyclohexane, 2,2-bis(4-hydroxyphenyl)norbornane, and 1,1-bis(4-hydroxyphenyl)cyclododecane; dihydroxyaryl ethers such as 4,4'-dihydroxyphenyl ether and 4,4'-dihydroxy-3,3'-dimethylphenyl ether; dihydroxydiaryl sulfides such as 4,4'-dihydroxydiphenyl sulfide and 4,4'-dihydroxy-3,3'-dimethyldiphenyl sulfide; dihydroxydiaryl sulfoxides such as 4,4'-dihydroxydiphenyl sulfoxide and 4,4'-dihydroxy-3,3'-dimethyldiphenyl sulfoxide; dihydroxydiaryl sulfones such as 4,4'-dihydroxydiphenyl sulfone and 4,4'-dihydroxy-3,3'-dimethyldiphenyl sulfone; dihydroxydiphenyls such as 4,4'-dihydroxydiphenyl; dihydroxydiarylfluorenes such as 9,9-bis(4-hydroxyphenyl)fluorene and 9,9-bis(4-hydroxy-3-methylphenyl)fluorene; dihydroxydiaryladamantanes such as 1,3-bis(4-hydroxyphenyl)adamantane, 2,2-bis(4-hydroxyphenyl)adamantane, and 1,3-bis(4-hydroxyphenyl)-5,7-dimethyladamantane; 4,4'-[1, 3-phenylenebis(1-methylethylidene)]bisphenol; 10,10-bis (4-hydroxyphenyl)-9-anthrone; and 1,5-bis(4-hydroxyphenylthio)-2,3-dioxapentaene. Those dihydric phenols may be used alone or as a mixture of two or more kinds thereof.

A molecular weight modifier, an end terminator, and the like may be used as required upon production of the aromatic polycarbonate as the component (A-2). Any one of the various modifiers, terminators, and the like typically used in the polymerization of polycarbonate resins can be used as the molecular weight modifier, end terminator, and the like.

Specific examples of the molecular weight modifier include monohydric phenols such as phenol, o-n-butylphenol, m-n-butylphenol, p-n-butylphenol, o-isobutylphenol, m-isobutylphenol, p-isobutylphenol, o-t-butylphenol, m-t-butylphenol, p-t-butylphenol, o-n-pentylphenol, m-n-pentylphenol, p-n-pentylphenol, o-n-hexylphenol, m-n-hexylphenol, p-n-hexylphenol, p-t-octylphenol, o-cyclohexylphenol, m-cyclohexylphenol, p-cyclohexylphenol, o-phenylphenol, m-phenylphenol, p-phenylphenol, o-nonylphenol, m-nonylphenol, p-nonylphenol, o-cumylphenol, m-cumylphenol, p-cumylphenol, o-naphthylphenol, m-naphthylphenol, p-naphthylphenol, 2,5-di-t-butylphenol, 2,4-di-t-butylphenol, 3,5-di-t-butylphenol, 2,5-dicumylphenol, 3,5-dicumylphenol, p-cresol, p-bromophenol, 2,4,6-tribromophenol, monoalkyl phenols each having a linear or branched alkyl group with an average carbon atom number of 12 to 35 at an ortho-, meta-, or para-position, 9-(4-hydroxyphenyl)-9-(4-methoxyphenyl)fluorene, 9-(4-hydroxy-3-methylphenyl)-9-(4-methoxy-3-methylphenyl) fluorene, and 4-(1-adamantyl)phenol.

Of those monohydric phenols, p-t-butylphenol, p-cumylphenol, p-phenylphenol, or the like is preferred. In addition, those compounds may be used alone or in combination of two or more kinds of the compounds.

As the end terminator, a monocarboxylic acid and a derivative thereof and a monohydric phenol may be used. Examples of such end terminator include p-tert-butyl-phenol, p-phenylphenol, p-cumylphenol, p-perfluorononylphenol, p-(perfluorononylphenyl)phenol, p-(perfluorohexylphenyl)phenol, p-tert-perfluorobutylphenol, 1-(p-hydroxybenzyl)perfluorodecane, p-[2-(1H,1H-perfluorotridodecyloxy)-1,1,1,3,3,3-hexafluoropropyl] phenol, 3,5-bis(perfluorohexyloxycarbonyl)phenol, perfluorododecyl p-hydroxybenzoate, p-(1H,1H-perfluorooctyloxy)phenol, 2H,2H,9H-perfluorononanoic acid, and 1,1,1,3,3,3-hexafluoro-2-propanol.

Further, a branching agent can be used to turn the dihydric phenol-based compound into branched polycarbonate. The addition amount of the branching agent is preferably from 0.01 to 3.0 mol %, more preferably from 0.1 to 2.0 mol % with respect to the dihydric phenol-based compound.

Examples of the branching agent include compounds each having three or more functional groups such as 1,1,1-tris(4-hydroxyphenyl)ethane, 4,4'-[1-[4-[1-(4-hydroxyphenyl)-1-methylethyl]phenyl]ethylidene]bisphenol, α,α',α''-tris(4-hydroxyphenyl)-1,3,5-triisopropylbenzene, 1-[α-methyl-α-(4'-hydroxyphenyl)ethyl]-4-[α,α'-bis(4''-hydroxyphenyl) ethyl]benzene, phloroglucin, trimellitic acid, and isatinbis (o-cresol).

The viscosity-average molecular weight of the other PC resin (A-2) is preferably from 15,000 to 80,000, more preferably from 16,000 to 60,000, still more preferably from 17,000 to 35,000. The use of PC resins having various viscosity-average molecular weights as the component (A-2) can adjust the viscosity-average molecular weight of the resin composition to be obtained within a desired range.

<Phosphorus-Based Antioxidant (B)>

The resin composition of the present invention contains the phosphorus-based antioxidant (B). The incorporation of the phosphorus-based antioxidant (B) can impart, to the resin composition, such excellent processing stability that even when the resin composition is retained at high temperatures at the time of its molding, its discoloration, the occurrence of silver, and the like can be suppressed.

The phosphorus-based antioxidant is preferably a phosphite-based antioxidant or a phosphine-based antioxidant from the viewpoint of obtaining a resin composition capable of suppressing the occurrence of, for example, its discoloration even when retained at high temperatures.

Examples of the phosphite-based antioxidant include trisnonylphenyl phosphite, triphenyl phosphite, tridecyl phosphite, trioctadecyl phosphite, tris(2,4-di-t-butylphenyl) phosphite (such as a product available under the trade name "Irgafos 168" from BASF), bis-(2,4-di-t-butylphenyl) pentaerythritol diphosphite (such as a product available under the trade name "Irgafos 126" from BASF and a product available under the trade name "ADK STAB PEP-24G" from ADEKA CORPORATION), bis(2,4-di-t-butyl-6-methylphenyl)ethyl phosphite (such as a product available under the trade name "Irgafos 38" from BASF), bis(2,6-di-t-butyl-4-methylphenyl) pentaerythritol diphosphite (such as a product available under the trade name "ADK STAB PEP-36" from ADEKA CORPORATION), distearyl pentaerythritol diphosphite (such as a product available under the trade name "ADK STAB PEP-8" from ADEKA CORPORATION and a product available under the trade name "JPP-2000" from JOHOKU CHEMICAL CO., LTD.), [bis(2,4-di-t-butyl-5-methylphenoxy)phosphino]biphenyl (such as a product available under the trade name "GSY-P101" from Osaki Industry Co., Ltd.), 6-[3-(3-t-butyl-4-hydroxy-5-methylphenyl)propoxy]-2,4,8,10-tetra-t-butyldibenzo[d,f][1, 3,2]dioxaphosphepin (such as a product available under the trade name "Sumilizer GP" from Sumitomo Chemical Co., Ltd.), and N,N-bis[2-[[2,4,8,10-tetrakis(1,1-dimethylethyl)dibenzo[d,f][1,3,2]dioxaphosphepin-6-yl]oxy]-ethyl]ethaneamine (such as a product available under the trade name "Irgafos 12" from BASF).

Further, examples include compounds represented by the following formulae (12) to (15).

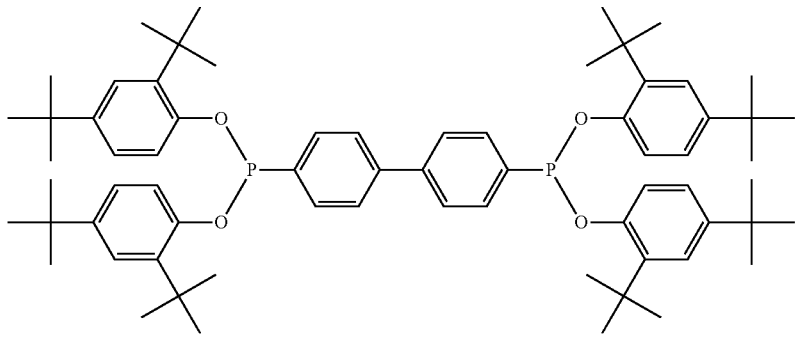

(12)

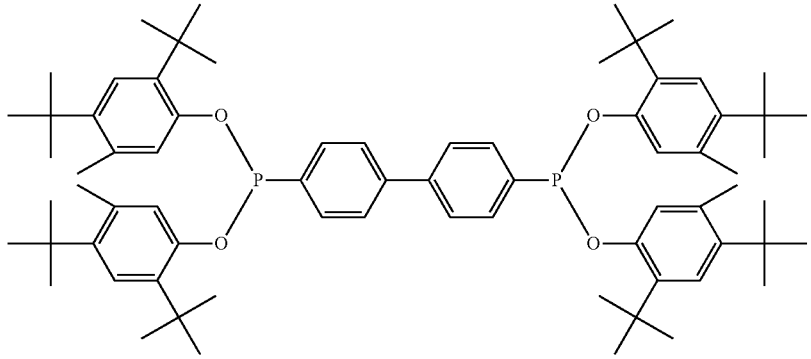

(13)

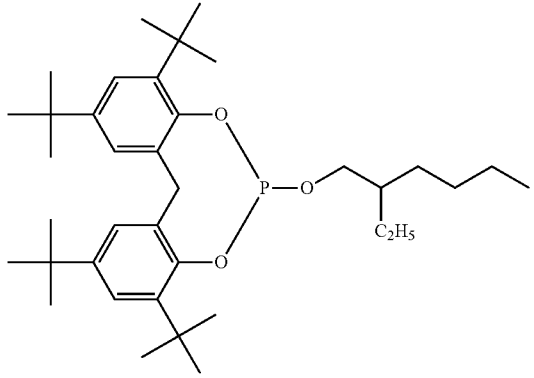

(14)

-continued

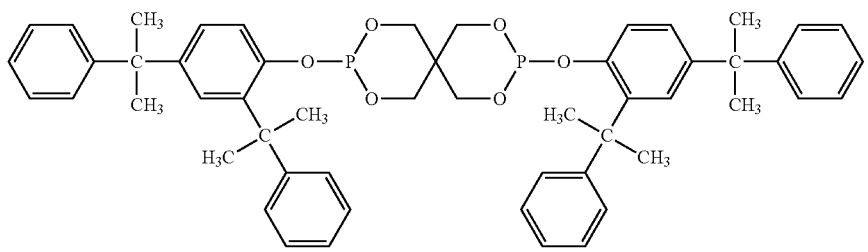

(15)

Of those phosphite-based antioxidants, tris-2,4-di-tert-butylphenyl phosphite is preferred from the viewpoint of hydrolysis resistance.

It should be noted that as described above, the phosphite-based antioxidant itself has such property as to be liable to hydrolyze. Accordingly, when a molded article formed of a polycarbonate resin composition containing a polycarbonate resin and the phosphite-based antioxidant is used under a high-temperature and high-humidity environment, the hydrolysis of the polycarbonate resin does not easily occur but the phosphite-based antioxidant is easily hydrolyzed. When the phosphite-based antioxidant is hydrolyzed and a certain amount or more of a hydrolysate (such as phosphorous acid) thereof is produced, the following tendency is observed: the hydrolysis of the polycarbonate resin itself is promoted and hence the molecular weight of the polycarbonate resin is reduced.

Accordingly, when a certain amount or more of the phosphite-based antioxidant is incorporated, the hydrolysis of the phosphite-based antioxidant needs to be suppressed by adding a specific amount of the epoxidation stabilizer as the component (C).

The phosphine-based antioxidant is, for example, triphenylphosphine ("JC263" manufactured by Johoku Chemical Co., Ltd.).

In the present invention, it is preferred that when the phosphine-based antioxidant is used as the component (B), the resin composition be substantially free of the epoxidation stabilizer as the component (C). Reasons for the foregoing are, for example, as follows: (1) the phosphine-based antioxidant has no hydrolyzability and hence there is no need to add the component (C); (2) the reduction ratio of the viscosity-average molecular weight of the resin composition after the pressure cooker test enlarges owing to an interaction between the phosphine-based antioxidant and the epoxidation stabilizer (C), and hence it becomes difficult to adjust the reduction ratio; and (3) when the resin composition is retained at high temperatures at the time of its molding, silver or the like occurs owing to the interaction with the component (C) and hence the processing stability reduces.

It should be noted that the phrase "substantially free of the component (C)" as used in the present invention means that the content of the component (C) is less than 0.001 parts by mass, preferably less than 0.0001 parts by mass with respect to 100 parts by mass of the component (A) (the phrase means the same in the following description).

The content of the phosphorus-based antioxidant (B) is from 0.002 to 0.200 parts by mass, preferably from 0.003 to 0.100 parts by mass, more preferably from 0.003 to 0.080 parts by mass with respect to 100 parts by mass of the component (A). When the content is less than 0.002 parts by mass, the discoloration of the resin composition, the occurrence of silver, and the like upon its retention at high temperatures cannot be sufficiently suppressed. On the other hand, when the content exceeds 0.200 parts by mass, the reduction ratio of the viscosity-average molecular weight after the pressure cooker test enlarges and hence it becomes difficult to adjust the reduction ratio.

When the phosphite-based antioxidant is used as the component (B) and the resin composition is substantially free of the component (C), the content of the phosphite-based antioxidant to be used as the component (B) is preferably 0.002 parts by mass or more and less than 0.020 parts by mass, more preferably from 0.002 to 0.018 parts by mass, still more preferably from 0.003 to 0.015 parts by mass, still more preferably from 0.003 to 0.012 parts by mass with respect to 100 parts by mass of the component (A). In the case where the resin composition is substantially free of the component (C), when the content of the phosphite-based antioxidant exceeds 0.020 parts by mass, a hydrolysate of the phosphite-based antioxidant largely affects the resin composition and hence it becomes difficult to adjust the reduction ratio of the viscosity-average molecular weight after the pressure cooker test to a predetermined value or less. In other words, when the content of the phosphite-based antioxidant is less than 0.020 parts by mass, the reduction ratio of the viscosity-average molecular weight of the resin composition after the pressure cooker test can be adjusted to the predetermined value or less without the incorporation of the component (C).

It should be noted that the phrase "substantially free of the component (C)" means that the resin composition is intentionally free of the component (C), and the content of the component (C) in the resin composition is less than 0.001 mass %, preferably less than 0.0001 mass %, more preferably less than 0.00001 mass %.

It should be noted that when the phosphite-based antioxidant is used as the component (B) and the resin composition contains the component (C), or when the phosphine-based antioxidant is used as the component (B), the content of the antioxidant to be used as the component (B) is from 0.002 to 0.200 parts by mass, preferably from 0.003 to 0.100 parts by mass, more preferably from 0.003 to 0.080 parts by mass with respect to 100 parts by mass of the component (A) as described above.

<Epoxidation Stabilizer (C)>

Basically, the resin composition of the present invention preferably contains the epoxidation stabilizer (C) when the phosphite-based antioxidant is used as the component (B).

The phosphite-based antioxidant is more liable to hydrolyze under a moist heat environment than the polycarbonate resin is. Further, decomposition products such as phosphorous acids and phenols produced by the hydrolysis each have an action of remarkably promoting the hydrolysis of the polycarbonate resin.

The component (B) is an important component in terms of processing stability and service stability, and hence needs to be used in a certain amount or more in the resin composition. However, when the component (B) is the phosphite-based antioxidant, its addition amount is limited to 0.020 parts by mass or less because of the foregoing reasons.

In view of the foregoing, the inventors of the present invention have made extensive studies on a method of suppressing the hydrolysis of the phosphite-based antioxidant. As a result, the inventors have found that the epoxidation stabilizer (C) has the following action: the stabilizer suppresses the hydrolysis of the phosphite-based antioxidant or detoxifies a decomposition product produced by the hydrolysis of the phosphite-based antioxidant. The finding has made it possible to adjust the reduction ratio of the viscosity-average molecular weight to the predetermined value or less as long as the epoxidation stabilizer (C) is used in combination even when 0.020 parts by mass or more of the phosphite-based antioxidant is added to the polycarbonate resin (A).

The epoxidation stabilizer (C) is, for example, a compound a part of the structure of which is epoxidized.

Of such epoxidation stabilizers (C), 3,4-epoxycyclohexenylmethyl-3',4'-epoxycyclohexene carboxylate (such as a product available under the trade name "CELLOXIDE 2021P" from Daicel Chemical Industries, Ltd.), a 1,2-epoxy-4-(2-oxiranyl)cyclohexane adduct of 2,2-bis(hydroxymethyl)-1-butanol (such as a product available under the trade name "EHPE3150" from Daicel Chemical Industries, Ltd.), and a mixture of these two kinds (available under the trade name "EHPE3150CE" from Daicel Chemical Industries, Ltd.), and an epoxidized natural oil or epoxidized synthetic oil having an oxirane oxygen concentration of 4% or more are preferred from the foregoing viewpoint.

Further, when a molded body formed of the resin composition is used in an application such as a container for food, the epoxidized natural oil or epoxidized synthetic oil having an oxirane oxygen concentration of 4% or more is more preferred from the viewpoint of producing a molded body capable of safely storing food.

Examples of the epoxidized natural oil having an oxirane oxygen concentration of 4% or more include SANSO CIZER E-2000H (trade name, manufactured by New Japan Chemical Co., Ltd., epoxidized soybean oil, oxirane oxygen concentration: 6.7% or more) and SANSO CIZER E-9000H (trade name, manufactured by New Japan Chemical Co., Ltd., epoxidized linseed oil, oxirane oxygen concentration: 8.5% or more).

Examples of the epoxidized synthetic oil having an oxirane oxygen concentration of 4% or more include SANSO CIZER E-PO (trade name, manufactured by New Japan Chemical Co., Ltd., diepoxystearyl epoxyhexahydrophthalate, oxirane oxygen concentration: 5.5% or more) and SANSO CIZER E-4030 (trade name, manufactured by New Japan Chemical Co., Ltd., epoxidized fatty acid butyl, oxirane oxygen concentration: 4.5% or more).

The oxirane oxygen concentration of the epoxidized natural oil or the epoxidized synthetic oil is 4% or more, preferably 5% or more, more preferably 6% or more, still more preferably 7% or more. When the oxirane oxygen concentration is less than 4%, a suppressing effect on the hydrolysis of the phosphite-based antioxidant or a detoxifying effect on a decomposition product produced by the hydrolysis is low, and as a result, the hydrolysis of the polycarbonate cannot be suppressed and it becomes difficult to adjust the reduction ratio of the molecular weight to the predetermined value or less.

It should be noted that the oxirane oxygen concentration means a value measured with a solution of hydrogen bromide in acetic acid on the basis of the provisions of ASTM-1652.

The content of the epoxidation stabilizer (C) is from 0 to 0.200 parts by mass with respect to 100 parts by mass of the component (A). When the content exceeds 0.200 parts by mass, the rise of the flowability of the polycarbonate resin composition, or burning or silver upon its molding occurs.

It should be noted that when the phosphine-based antioxidant having no hydrolyzability is used as the component (B), there is no need to add the epoxidation stabilizer (C) because a decomposition product that promotes the hydrolysis of the polycarbonate resin is not produced unlike the phosphite-based antioxidant. Both the epoxidation stabilizer (C) and the phosphine-based antioxidant are compounds each having high activity. Accordingly, it is preferred that when the phosphine-based antioxidant is used as the component (B), the resin composition be substantially free of the component (C) in order that an unnecessary reaction between the stabilizer and the antioxidant may not be caused.

It should be noted that the phrase "substantially free of the component (C)" means that the resin composition is intentionally free of the component (C).

Specifically, the content of the component (C) when the phosphine-based antioxidant is used as the component (B) is preferably less than 0.001 parts by mass, more preferably less than 0.0001 parts by mass with respect to 100 parts by mass of the component (A).

In addition, when the phosphite-based antioxidant having hydrolyzability is used as the component (B) and the content of the phosphite-based antioxidant as the component (B) with respect to 100 parts by mass of the component (A) is from 0.020 to 0.200 parts by mass, the content of the component (C) is preferably more than 0 parts by mass and 0.200 parts by mass or less, more preferably from 0.002 to 0.200 parts by mass, still more preferably from 0.01 to 0.100 parts by mass, still more preferably from 0.015 to 0.050 parts by mass with respect to 100 parts by mass of the component (A) from the viewpoint of adjusting the reduction ratio of the viscosity-average molecular weight of the resin composition to be obtained after the pressure cooker test to the predetermined value or less.

<Other Additives>

The resin composition of the present invention can be blended with any one of the various known additives, which have heretofore been added to a polycarbonate resin composition, as required in addition to the components (A) to (C) as long as the effects of the present invention are not impaired.

Examples of the additives include a reinforcing material, a filler, a stabilizer, an antioxidant, a UV absorber, an antistatic agent, a lubricant, a releasing agent, a dye, a pigment, a flame retardant, and an elastomer for improving impact resistance.

[Molded Article]

A molded article formed of the polycarbonate-based resin composition of the present invention is obtained by blending the above-mentioned components and kneading the mixture, followed by molding of the resultant.

A kneading method is not particularly limited and an example thereof is a method involving using a ribbon blender, a Henschel mixer, a Banbury mixer, a drum tumbler, a single-screw extruder, a twin-screw extruder, a co-kneader, a multi-screw extruder, or the like. Further, a heating temperature at the time of the kneading is selected from the range of typically from 240 to 330° C., preferably from 250 to 320° C.

Various conventionally known molding methods can each be employed as a molding method, and examples thereof include an injection molding method, an injection compression molding method, an extrusion molding method, a blow molding method, a press molding method, a vacuum molding method, and a foam molding method.

It should be noted that any component to be incorporated other than the polycarbonate resin can be melt-kneaded with the polycarbonate resin or another thermoplastic resin in advance before being added: the component can be added as a master batch.

In addition, the resin composition is preferably pelletized and subjected to injection molding. A general injection molding method or injection compression molding method, and a special molding method such as a gas assist molding method can be employed to produce various molded articles.

The molded body formed of the polycarbonate resin composition of the present invention can maintain its excellent impact resistance at low temperatures over a long time period even when repeatedly used under a high-temperature and high-humidity environment. Accordingly, the molded body of the present invention is suitable for a product or part to be washed with hot water at 90° C. or more and/or steam at 100° C. or more, or a product or part to be used under an environment having a temperature of 60° C. or more and a relative humidity of 90% or more, and an environment repeatedly changing between such environment and a low-temperature environment having a subzero temperature.

More specifically, the molded body of the present invention preferably finds use in applications such as a chocolate processing die or ice cream processing die to be washed with steam after being refrigerated and used, a container for storing frozen food, a processing pool for seafood, and a container to be used in a dish dryer, rice cooker, or the like. The molded body also suitably finds use in applications such as industrial parts including an instrumentation box or junction box under a high-temperature and high-humidity environment, and an underground member in a cold district.

EXAMPLES

Hereinafter, the present invention is described in more detail by way of Examples, but the present invention is by no means limited to Examples below.

It should be noted that methods of measuring (methods of calculating), for example, the following physical property values in Examples are as described below.
(1) Method of Measuring Viscosity Number (VN)

Measurement was performed in conformity with ISO 1628-4 (1999).
(2) Method of Measuring Viscosity-Average Molecular Weight The limiting viscosity [η] of a methylene chloride solution at 20° C. was measured with an Ubbelohde viscosity tube, followed by calculation from the following relational equation (Schnell's equation).

$$[\eta]=1.23\times10^{-5}\times M_v^{0.83}$$

Production Example 1

Synthesis Example of Polycarbonate Oligomer

Added to a 5.6-mass % aqueous sodium hydroxide were 2,000 ppm by mass of sodium dithionite with respect to bisphenol A to be dissolved later. Bisphenol A was dissolved in the solution so that the concentration of bisphenol A became 13.5 mass %. Thus, a solution of bisphenol A in aqueous sodium hydroxide was prepared.

The solution of bisphenol A in aqueous sodium hydroxide, methylene chloride, and phosgene were continuously passed through a tubular reactor having an inner diameter of 6 mm and a tube length of 30 m at flow rates of 40 L/hr, 15 L/hr, and 4.0 kg/hr, respectively. The tubular reactor had a jacket portion and the temperature of a reaction liquid was kept at 40° C. or less by passing cooling water through the jacket.

The reaction liquid that had exited the tubular reactor was continuously introduced into a baffled vessel-type reactor having an internal volume of 40 L provided with a swept-back blade, and then 2.8 L/hr of the solution of bisphenol A in aqueous sodium hydroxide, 0.07 L/hr of a 25-mass % aqueous sodium hydroxide, 17 L/hr of water, and 0.64 L/hr of a 1-mass % aqueous solution of triethylamine were further added to the reactor to perform a reaction. The reaction liquid flowing out of the vessel-type reactor was continuously extracted, and then an aqueous phase was separated and removed by leaving the liquid at rest, followed by the collection of a methylene chloride phase.

The concentration of the polycarbonate oligomer thus obtained was 318 g/L and the concentration of a chloroformate group was 0.75 mol/L. Further, its weight-average molecular weight (Mw) was 1,190.

It should be noted that the weight-average molecular weight (Mw) was measured as a molecular weight in terms of standard polystyrene (weight-average molecular weight: Mw) by GPC (column: TOSOH TSK-GEL MULTIPORE HXL-M (two)+Shodex KF801 (one), temperature: 40° C., flow rate: 1.0 ml/min, detector: RI) involving using tetrahydrofuran (THF) as a developing solvent.

Production Example 2

Synthesis of PC-PDMS Copolymer (SIPC-1)

15 Liters of the polycarbonate oligomer solution produced in Production
Example 1, 8.9 L of methylene chloride, 307 g of a 2-allylphenol terminal-modified polydimethylsiloxane (PDMS-1) in which the average repetition number n of dimethylsiloxy units was 90, and 8.8 mL of triethylamine were loaded into a 50-L vessel-type reactor provided with a baffle board, a paddle-type stirring blade, and a cooling jacket. While the mixture was stirred, 1,389 g of a 6.4-mass % aqueous sodium hydroxide were added to the mixture to perform a reaction between the polycarbonate oligomer and the 2-allylphenol terminal-modified polydimethylsiloxane for 10 minutes.

A solution of p-t-butylphenol (PTBP) in methylene chloride (prepared by dissolving 129 g of PTBP in 2.0 L of methylene chloride) and a solution of bisphenol A in aqueous sodium hydroxide (prepared by dissolving 1,147 g of bisphenol A in an aqueous solution prepared by dissolving 581 g of sodium hydroxide and 2.3 g of sodium dithionite in 8.5 L of water) were added to the polymer liquid to perform a polymerization reaction for 50 minutes. 10 Liters of methylene chloride were added to the resultant to dilute the resultant, and then the mixture was stirred for 10 minutes. After that, the mixture was separated into an organic phase containing polycarbonate, and an aqueous phase containing excessive amounts of bisphenol A and sodium hydroxide, and then the organic phase was isolated.

The solution of the polycarbonate-polydimethylsiloxane copolymer in methylene chloride thus obtained was sequentially washed with a 0.03-mol/L aqueous sodium hydroxide and 0.2-mol/L hydrochloric acid in amounts of 15 vol % each with respect to the solution. Next, the solution was repeatedly washed with pure water until an electric conductivity in an aqueous phase after the washing became 0.01 μS/m or less. The solution of the polycarbonate-polydimethylsiloxane copolymer in methylene chloride obtained by the washing was concentrated and pulverized, and then the resultant flake was dried under reduced pressure at 120° C.

The polycarbonate-polydimethylsiloxane copolymer (PC-PDMS copolymer (SIPC-1)) obtained as described above had an amount of a polydimethylsiloxane residue determined by NMR measurement of 6.0 mass %, a viscosity number of 46.9, and a viscosity-average molecular weight of 17,400.

Production Example 3

Synthesis of PC-PDMS Copolymer (SIPC-2)

15 Liters of the polycarbonate oligomer solution produced in Production Example 1, 8.9 L of methylene chloride, 307 g of a 2-allylphenol terminal-modified polydimethylsiloxane (PDMS-2) in which the average repetition number n of dimethylsiloxy units was 40, and 8.8 mL of triethylamine were loaded into a 50-L vessel-type reactor provided with a baffle board, a paddle-type stirring blade, and a cooling jacket. While the mixture was stirred, 1,389 g of a 6.4-mass % aqueous sodium hydroxide were added to the mixture to perform a reaction between the polycarbonate oligomer and the 2-allylphenol terminal-modified polydimethylsiloxane for 10 minutes.

A solution of p-t-butylphenol (PTBP) in methylene chloride (prepared by dissolving 129 g of PTBP in 2.0 L of methylene chloride) and a solution of bisphenol A in aqueous sodium hydroxide (prepared by dissolving 1,147 g of bisphenol A in an aqueous solution prepared by dissolving 581 g of sodium hydroxide and 2.3 g of sodium dithionite in 8.5 L of water) were added to the polymer liquid to perform a polymerization reaction for 50 minutes. 10 Liters of methylene chloride were added to the resultant to dilute the resultant, and then the mixture was stirred for 10 minutes. After that, the mixture was separated into an organic phase containing polycarbonate, and an aqueous phase containing excessive amounts of bisphenol A and sodium hydroxide, and then the organic phase was isolated.

The solution of the polycarbonate-polydimethylsiloxane copolymer in methylene chloride thus obtained was sequentially washed with a 0.03-mol/L aqueous sodium hydroxide and 0.2-mol/L hydrochloric acid in amounts of 15 vol % each with respect to the solution. Next, the solution was repeatedly washed with pure water until an electric conductivity in an aqueous phase after the washing became 0.01 μS/m or less. The solution of the polycarbonate-polydimethylsiloxane copolymer in methylene chloride obtained by the washing was concentrated and pulverized, and then the resultant flake was dried under reduced pressure at 120° C.

The polycarbonate-polydimethylsiloxane copolymer (PC-PDMS copolymer (SIPC-2)) obtained as described above had an amount of a polydimethylsiloxane residue determined by NMR measurement of 6.2 mass %, a viscosity number of 46.9, and a viscosity-average molecular weight of 17,400.

Examples 1 to 16 And Comparative Examples 1 to 12

Production of Pellet

Components shown in Table 1 and Table 2 were blended in amounts shown in the tables (unit: part(s) by mass) to prepare resin compositions. The resin compositions were each extruded into a strand at 30 kg/hr with a uniaxial extruder "NVC-50" (product name, manufactured by NAKATANI KIKAI CO., LTD.) having a heater temperature set to 280° C., and a pellet was produced from the strand with a strand cutter.

(Production of Test Plate)

The produced pellet was sufficiently dried, and was then subjected to injection molding with an injection molding machine "IS 150E" (product name, manufactured by TOSHIBA MACHINE CO., LTD.) and a corner plate No. 2 die at a molding temperature of 310° C. and a die temperature of 80° C. to produce 30 test plates each measuring 2.0 mm thick by 140 mm long by 140 mm wide.

It should be noted that the respective components shown in Table 1 and Table 2 are as described below.

Component (A-1)

"SIPC-1" (PC-PDMS copolymer produced in Production Example 2)

"SIPC-2" (PC-PDMS copolymer produced in Production Example 3) Component (A-2)

"TARFLON FN1700A" (trade name, manufactured by Idemitsu Kosan Co., Ltd., bisphenol A polycarbonate having p-t-butylphenol as a terminal group, viscosity number: 46.6, viscosity-average molecular weight Mv=17,300)

"TARFLON FN1900A" (trade name, manufactured by Idemitsu Kosan Co., Ltd., bisphenol A polycarbonate having p-t-butylphenol as a terminal group, viscosity number: 51.1, viscosity-average molecular weight Mv=19,300)

"TARFLON FN2200A" (trade name, manufactured by Idemitsu Kosan Co., Ltd., bisphenol A polycarbonate having p-t-butylphenol as a terminal group, viscosity number: 55.6, viscosity-average molecular weight Mv=21,300)

"TARFLON FN2500A" (trade name, manufactured by Idemitsu Kosan Co., Ltd., bisphenol A polycarbonate having p-t-butylphenol as a terminal group, viscosity number: 62.2, viscosity-average molecular weight Mv=24,200)

"TARFLON FN2600A" (trade name, manufactured by Idemitsu Kosan Co., Ltd., bisphenol A polycarbonate having p-t-butylphenol as a terminal group, viscosity number: 64.9, viscosity-average molecular weight Mv=25,400)

"NOVAREX 7030PJ" (trade name, manufactured by Mitsubishi Engineering-Plastics Corporation, bisphenol A polycarbonate having p-t-butylphenol as a terminal group, viscosity number: 73.7, viscosity-average molecular weight: Mv=29,300)

Component (B)

"IRGAFOS 168" (trade name, manufactured by BASF, tris(2,4-di-t-butylphenyl) phosphite)

"JC263" (trade name, manufactured by JOHOKU CHEMICAL CO., LTD., triphenyl phosphine)

Component (C)

"Celloxide 2021P" (trade name, manufactured by DAICEL CORPORATION, 3,4-epoxycyclohexenylmethyl-3',4'-epoxycyclohexenecarboxylate)

"SANSO CIZER E-PO" (trade name, manufactured by New Japan Chemical Co., Ltd., diepoxystearyl epoxyhexahydrophthalate, oxirane oxygen concentration: 5.50%)

"SANSO CIZER E-2000H" (trade name, manufactured by New Japan Chemical Co., Ltd., epoxidized soybean oil, oxirane oxygen concentration: 6.70%)

"SANSO CIZER E-9000H" (trade name, manufactured by New Japan Chemical Co., Ltd., epoxidized linseed oil, oxirane oxygen concentration: 8.50%)

"SANSO CIZER E-PS" (trade name, manufactured by New Japan Chemical Co., Ltd., di-2-ethylhexyl epoxyhexahydrophthalate, oxirane oxygen concentration: 3.40%)

"SANSO CIZER E-6000" (trade name, manufactured by New Japan Chemical Co., Ltd., di-2-ethylhexyl epoxyhexahydrophthalate, oxirane oxygen concentration: 3.50%)

The following tests were performed by using the produced pellets and test plates. Table 1 and Table 2 show the results of the tests.

(1) Measurement item before pressure cooker test (PCT)

(1-1) Measurement of viscosity number (VN) and viscosity-average molecular weight (Mv)

The viscosity number (VN) and viscosity-average molecular weight (Mv) of a resin composition (pellet) before a pressure cooker test were measured on the basis of the foregoing measurement methods.

(1-2) Low-Temperature Falling Weight Impact Test

A produced test plate was immersed in ethanol and cooled at −30° C. Then, the cooled test plate was fixed onto an impact base having a diameter of 75 mm of an automatic falling weight impact tester "HYDOSHOT" (manufactured by Shimadzu Corporation), an impact shaft having a diameter of 12.7 mm was butted against the test plate at a speed of 3.9 m/sec, and the fracture situation of the test plate was observed in conformity with JIS K 7211-2. The case where the impact shaft penetrated through the test plate, and the cracking of the test plate, the scattering of a fragment thereof, or the like did not occur was defined as ductile fracture, and the case where the test plate cracked to scatter a fragment thereof or the like was defined as brittle fracture. The foregoing was performed on 5 test plates, and the number of the test plates that had undergone the ductile fracture out of the 5 test plates was counted. A fracture energy (J) generated at the time of the impact was simultaneously measured.

(1-3) Measurement of Melt Volume Flow Rate (MVR)

Measurement was performed with an MVR-measuring machine in conformity with JIS K 7210. That is, the MVR-measuring machine was used, the temperature of a cylinder of the measuring machine was increased to 300° C., and aging was performed for 15 minutes or more, followed by the loading of a sample (prepared resin composition). Then, a piston and a weight were mounted on the sample so that a load became 1.2 kg, and preheating was performed. The sample that had flowed out in 30 seconds was cut out, the amount of the sample that had flowed out was measured, and the measured value was converted into an outflow per 10 minutes.

(1-4) Measurement of Flow Value (Q Value)

Measurement was performed with an elevated flow tester in conformity with JIS K 7210. That is, the amount (mL/sec) of a molten resin flowing out of a nozzle having a diameter of 1 mm and a length of 10 mm at 280° C. under a pressure of 15.7 MPa was measured. A flow value (Q value) increases as a melt viscosity reduces.

(1-4) Method for Pressure Cooker Test (PCT)

An end of a produced test plate measuring 2.0 mm thick by 140 mm long by 140 mm wide was perforated with two 1-mm holes, and the test plate was suspended in a wire basket made of stainless steel larger than the test plate with a wire made of stainless steel. Each test plate was fixed with a clip so that suspended test plates were out of contact with each other, a distance of 1 mm or more was provided between the test plates, and 10 test plates were suspended for each formulation. The basket was loaded in an amount corresponding to 5 formulations into each of 4 pressure cooker testers (manufactured by NAKAYAMA) each of which had been filled with about 5 l of pure water at its bottom, followed by steaming in the testers at 121° C. for 300 hours. Simultaneously, for molecular weight measurement, the same pellet as that used in the production of each test plate was loaded in an amount of from 10 to 20 $cm^3$ into a stainless dish having a diameter of 40 mm and a height of 15 mm, the dish was loaded into the same pressure cooker tester as those for the test plates, and the pellet was steamed. The operations were repeated to provide 20 test plates and a pellet for evaluating each of the test plates for its degree of hydrolysis for each formulation.

(2) Evaluation after Pressure Cooker Test (PCT)

(2-1) Measurement of Viscosity Number (VN) and Viscosity-Average Molecular Weight (Mv)

The pellet for evaluating a degree of hydrolysis subjected to the pressure cooker tester was used, the viscosity number (VN) and viscosity-average molecular weight (Mv) of the resin composition (pellet) were measured on the basis of the foregoing measurement methods, and a difference (ΔMv) from the viscosity-average molecular weight before the test and the reduction ratio P of the viscosity-average molecular weight were calculated from the following calculation equation.

$$P\ [\%] = (M_1 - M_2)/M_1 \times 100$$

($M_1$ represents the viscosity-average molecular weight of the resin composition (pellet) before the pressure cooker test and $M_2$ represents the viscosity-average molecular weight of the resin composition (pellet) after the pressure cooker test.)

(2-2) Evaluation for Low-Temperature Falling Weight Impact Resistance

A test plate subjected to the pressure cooker tester was subjected to an automatic falling weight impact test under the same conditions as those described in the foregoing, and its fracture situation was observed. The foregoing was performed on 20 test plates subjected to the pressure cooker tester, and the number of the test plates that had undergone ductile fracture out of the 20 test plates was counted.

(3) Evaluation for Molding Stability (Retention Test)

The pellets before the pressure cooker test produced in Examples and Comparative Examples were each molded into a flat molded body (measuring 3.0 mm thick by 40 mm long by 80 mm wide) with a 40-ton injection molding machine (available under the product name "EC40N" from TOSHIBA MACHINE CO., LTD.) at a molding temperature of 360° C. and a die temperature of 80° C. A retention evaluation was performed as described below. 20 Shots were molded at a molding temperature of 360° C. in a cycle of 20 seconds until a temperature condition stabilized, and then the cycle was changed to 300 seconds and 5 shots (20 minutes) were collected. The presence or absence of the discoloration of the resultant molded body or the occurrence of silver was evaluated by the following criteria.

A: The discoloration (yellowing) of the molded body or the occurrence of silver is not observed.

B: The discoloration (yellowing) of the molded body or the occurrence of silver is partially observed but is not conspicuous.

C: The discoloration (yellowing) of the molded body or the occurrence of silver is conspicuous.

TABLE 1

| PC resin mixture (A) | Grade | Molecular weight | Amount of PDMS | Example 1 | Example 2 | Example 3 | Example 4 | Example 5 | Example 6 | Example 7 | Example 8 |
|---|---|---|---|---|---|---|---|---|---|---|---|
| PC-PDMS | SIPC-1 | 17,400 | 6.0 | 55.0 | 55.0 | 83.0 | 80.0 | 55.0 | 55.0 | 55.0 | 55.0 |
| PC-PDMS | SIPC-2 | 17,400 | 6.2 | | | | | | | | |
| PC | TARFLON FN1700A | 17,300 | 0.0 | | | | 3.0 | | | | |
| PC | TARFLON FN1900A | 19,300 | 0.0 | | | | | 3.0 | | | |
| PC | TARFLON FN2500A | 24,200 | 0.0 | | | | | | | | |
| PC | TARFLON FN2600A | 25,400 | 0.0 | 29.0 | 29.0 | 14.0 | | 29.0 | 29.0 | 29.0 | 29.0 |
| PC | NOVAREX 7030PJ | 29,300 | 0.0 | 16.0 | 16.0 | | 17.0 | 16.0 | 16.0 | 16.0 | 16.0 |
| Loading | | Amount of PDMS | | 3.3 | 3.3 | 5.0 | 4.8 | 3.3 | 3.3 | 3.3 | 3.3 |
| | | Viscosity-average molecular weight | | 21,500 | 21,500 | 18,500 | 19,500 | 21,500 | 21,500 | 21,500 | 21,500 |

| Antioxidant (B) | Grade | — | | | | | | | | | |
|---|---|---|---|---|---|---|---|---|---|---|---|
| Phosphite-based antioxidant | IRGAFOS 168 | | | 0.005 | 0.01 | 0.05 | 0.05 | 0.05 | 0.025 | 0.025 | 0.025 |
| Phosphine-based antioxidant | JC263 | | | | | | | | | | |

| Epoxidation stabilizer (C) | Grade | Oxirane oxygen concentration | | | | | | | | | |
|---|---|---|---|---|---|---|---|---|---|---|---|
| CELLOXIDE | 2021P | — | | — | — | 0.02 | 0.02 | 0.02 | — | — | — |
| SANSO CIZER | E-PO | 5.50% | | — | — | — | — | — | 0.02 | 0.04 | — |
| SANSO CIZER | E-2000H | 6.70% | | — | — | — | — | — | — | — | 0.02 |
| SANSO CIZER | E-9000H | 8.50% | | — | — | — | — | — | — | — | — |

| | | | | Example 1 | Example 2 | Example 3 | Example 4 | Example 5 | Example 6 | Example 7 | Example 8 |
|---|---|---|---|---|---|---|---|---|---|---|---|
| Evaluation before PCT | | | | | | | | | | | |
| Before PCT | Molecular weight | Viscosity number | ml/g | 56.2 | 56.6 | 49.6 | 52.0 | 56.4 | 56.3 | 56.4 | 56.3 |
| | | Viscosity-average molecular weight | Mv | 21,500 | 21,700 | 18,600 | 19,600 | 21,600 | 21,500 | 21,600 | 21,500 |
| | Automatic falling weight | −30° C. Ductile fracture | J Plates/total number of test plates | 19.2 / 5/5 | 19.6 / 5/5 | 13.2 / 5/5 | 13.1 / 5/5 | 13.2 / 5/5 | 21.8 / 5/5 | 23.6 / 5/5 | 23.3 / 5/5 |
| | Flowability | MVR/300° C. | cc/10 min | 7.0 | 7.0 | 10.0 | 9.0 | 7.0 | 7.0 | 7.0 | 7.0 |
| | | Q value/280° C. | E-2 ml/sec | 4.9 | 4.9 | 8.0 | 7.0 | 4.9 | 4.9 | 4.9 | 4.9 |
| Evaluation after PCT | | | | | | | | | | | |
| After PCT at 120° C. for 300 hours | Molecular weight | VN | ml/g | 48.8 | 48.1 | 45.7 | 47.0 | 52.6 | 48.5 | 48.8 | 48.4 |
| | | Molecular weight | Mv | 18,200 | 17,900 | 16,900 | 17,400 | 19,900 | 18,100 | 18,200 | 18,000 |
| | | | ΔMv | 3,300 | 3,800 | 1,700 | 2,200 | 1,700 | 3,400 | 3,400 | 3,500 |
| | | Molecular weight reduction ratio | % | 15 | 18 | 9 | 11 | 8 | 16 | 16 | 16 |
| | Automatic falling weight | −30° C. Ductile fracture | J Plates/total number of test plates | 12.7 / 20/20 | 19.9 / 19/20 | 13.5 / 17/20 | 18.7 / 19/20 | 17.1 / 20/20 | 15.8 / 20/20 | 20.5 / 20/20 | 13.1 / 20/20 |
| Processing stability | | | | | | | | | | | |
| Retention test at 360° C. | Stationary molding Retention for 5 minutes | Suppressing effect on discoloration or the like | | A | A | A | A | A | A | A | A |
| | | | | A | A | A | A | A | A | A | A |
| | Retention for 10 minutes | | | B | A | A | A | A | A | A | A |

TABLE 1-continued

|  |  |  | | | | | | | | |
|---|---|---|---|---|---|---|---|---|---|---|
| Retention for 15 minutes | | | B | B | B | A | A | A | A | A |
| Retention for 20 minutes | | | C | B | B | B | A | A | A | A |

|  |  |  |  | Example 9 | Example 10 | Example 11 | Example 12 | Example 13 | Example 14 | Example 15 | Example 16 |
|---|---|---|---|---|---|---|---|---|---|---|---|
| PC resin mixture (A) | Grade | Molecular weight | Amount of PDMS | | | | | | | | |
| PC-PDMS | SIPC-1 | 17,400 | 6.0 | 55.0 | 55.0 | 55.0 | 55.0 | 55.0 | | | |
| PC-PDMS | SIPC-2 | 17,400 | 6.2 | | | | | | 50.0 | 50.0 | 50.0 |
| PC | TARFLON FN1700A | 17,300 | 0.0 | | | | | | | | |
| PC | TARFLON FN1900A | 19,300 | 0.0 | | | | | | | | |
| PC | TARFLON FN2500A | 24,200 | 0.0 | | | | 22.0 | 22.0 | | | |
| PC | TARFLON FN2600A | 25,400 | 0.0 | 29.0 | 29.0 | 29.0 | 23.0 | 23.0 | 42.0 | 42.0 | 42.0 |
| PC | NOVAREX 7030PJ | 29,300 | 0.0 | 16.0 | 16.0 | 16.0 | | | 8.0 | 8.0 | 8.0 |
| Loading | | Amount of PDMS | | 3.3 | 3.3 | 3.3 | 3.3 | 3.3 | 3.1 | 3.1 | 3.1 |
| | | Viscosity-average molecular weight | | 21,500 | 21,500 | 21,500 | 20,500 | 20,500 | 21,700 | 21,700 | 21,700 |
| Antioxidant (B) | Grade | — | | | | | | | | | |
| Phosphite-based antioxidant | IRGAFOS 168 | | | 0.025 | 0.025 | 0.025 | | | 0.005 | 0.020 | 0.025 |
| Phosphine-based antioxidant | JC263 | | | | | | 0.025 | 0.05 | | | |
| Epoxidation stabilizer (C) | Grade | Oxirane oxygen concentration | | | | | | | | | |
| CELLOXIDE | 2021P | — | | — | — | — | — | — | — | — | 0.02 |
| SANSO CIZER | E-PO | 5.50% | | — | — | — | — | — | — | — | — |
| | E-2000H | 6.70% | | 0.04 | — | — | — | — | — | — | — |
| | E-9000H | 8.50% | | — | 0.02 | 0.04 | — | — | — | 0.04 | — |

|  |  |  |  | Example 9 | Example 10 | Example 11 | Example 12 | Example 13 | Example 14 | Example 15 | Example 16 |
|---|---|---|---|---|---|---|---|---|---|---|---|
| | Evaluation before PCT | | | | | | | | | | |
| Before PCT | Molecular weight | Viscosity number | ml/g | 56.2 | 56.7 | 56.0 | 53.6 | 53.8 | 56.6 | 56.8 | 55.9 |
| | | Viscosity-average molecular weight | Mv | 21,500 | 21,700 | 21,400 | 20,400 | 20,400 | 21,700 | 21,800 | 21,400 |
| | Automatic falling weight | −30° C. Ductile fracture | J Plates/total number of test plates | 22.4 5/5 | 23.9 5/5 | 23.5 5/5 | 22.7 5/5 | 22.4 5/5 | 20.7 5/5 | 19.8 5/5 | 19.9 5/5 |
| | Flowability | MVR/300° C. Q value/280° C. | cc/10 min E-2 ml/sec | 7.0 4.9 | 7.0 4.9 | 7.0 4.9 | 8.0 6.2 | 8.0 6.2 | 8.0 6.2 | 8.0 6.2 | 8.0 6.2 |
| | Evaluation after PCT | | | | | | | | | | |
| After PCT at 120° C. for 300 hours | Molecular weight | VN | ml/g | 49.3 | 48.9 | 49.7 | 48.6 | 49.1 | 50.5 | 50.0 | 49.6 |
| | | Molecular weight | Mv | 18,400 | 18,300 | 18,600 | 18,100 | 18,400 | 19,000 | 18,800 | 18,600 |
| | | Molecular weight | ΔMv | 3,100 | 3,400 | 2,800 | 2,300 | 2,000 | 2,700 | 3,000 | 2,800 |
| | | Molecular weight reduction ratio | % | 14 | 16 | 13 | 11 | 10 | 12 | 14 | 13 |
| | Automatic falling weight | −30° C. Ductile fracture | J Plates/total number of test plates | 16.1 20/20 | 19.4 20/20 | 18.5 20/20 | 11.5 20/20 | 11.1 20/20 | 10.5 20/20 | 13.4 20/20 | 21.5 20/20 |

TABLE 1-continued

| | Processing stability | | | | | | | | | |
|---|---|---|---|---|---|---|---|---|---|---|
| Retention test at 360° C. | Stationary molding | Suppressing effect on discoloration or the like | A | A | A | A | A | A | A | A |
| | Retention for 5 minutes | | A | A | A | A | A | A | A | A |
| | Retention for 10 minutes | | A | A | A | B | A | B | A | A |
| | Retention for 15 minutes | | A | A | A | B | B | B | A | A |
| | Retention for 20 minutes | | A | A | A | B | B | C | B | A |

TABLE 2

| PC resin mixture (A) | Grade | Molecular weight | Amount of PDMS | Comparative Example 1 | Comparative Example 2 | Comparative Example 3 | Comparative Example 4 | Comparative Example 5 | Comparative Example 6 |
|---|---|---|---|---|---|---|---|---|---|
| PC-PDMS | SIPC-1 | 17,400 | 6.0 | | 80.0 | 72.0 | 55.0 | 55.0 | 55.0 |
| PC-PDMS | SIPC-2 | 17,400 | 6.2 | | | | | | |
| PC | TARFLON FN1700A | 17,300 | 0.0 | | | | | | |
| PC | TARFLON FN1900A | 19,300 | 0.0 | | | | | | |
| PC | TARFLON FN2200A | 21,300 | 0.0 | 100.0 | 6.0 | | | | |
| PC | TARFLON FN2500A | 24,200 | 0.0 | | 14.0 | 3.0 | 22.0 | | |
| PC | TARFLON FN2600A | 25,400 | 0.0 | | | 25.0 | 23.0 | 29.0 | 29.0 |
| PC | NOVAREX 7030PJ | 29,300 | 0.0 | | | | | 16.0 | 16.0 |
| Loading | Amount of PDMS | | | 0.0 | 4.8 | 4.3 | 3.3 | 3.3 | 3.3 |
| | Viscosity-average molecular weight of component (A) | | | 21,500 | 18,500 | 19,500 | 20,500 | 21,500 | 21,500 |

| Antioxidant (B) | Grade | — | | | | | | | |
|---|---|---|---|---|---|---|---|---|---|
| Phosphite-based antioxidant | IRGAFOS 168 | | | | | | | 0.03 | 0.025 |
| Phosphine-based antioxidant | JC263 | | | | | | | | |

| Epoxidation stabilizer (C) | Grade | Oxirane oxygen concentration | | | | | | | |
|---|---|---|---|---|---|---|---|---|---|
| CELLOXIDE | 2021P | — | | | | | | | |
| SANSO CIZER | E-PS | 3.40% | | | | | | | |
| | E-6000 | 3.50% | | | | | | | 0.04 |

| | | | | Comparative Example 1 | Comparative Example 2 | Comparative Example 3 | Comparative Example 4 | Comparative Example 5 | Comparative Example 6 |
|---|---|---|---|---|---|---|---|---|---|
| | Evaluation before PCT | | | | | | | | |
| Before PCT | Molecular weight | Viscosity number | ml/g | 56.3 | 48.9 | 51.1 | 53.9 | 57.5 | 55.9 |
| | | Viscosity-average molecular weight | Mv | 21,500 | 18,300 | 19,200 | 20,500 | 22,100 | 21,400 |
| | Automatic falling weight | −30° C. | J | 17.5 | 18.5 | 21.3 | 22.5 | 20.2 | 24.1 |
| | | Ductile fracture | Plates/total number of test plates | 5/5 | 5/5 | 5/5 | 5/5 | 5/5 | 5/5 |
| | Flowability | MVR/300° C. | cc/10 min | 7.0 | 10.0 | 9.0 | 8.0 | 7.0 | 7.0 |
| | | Q value/280° C. | E-2 ml/sec | 4.9 | 8.0 | 7.0 | 5.5 | 4.9 | 4.9 |
| | Evaluation after PCT | | | | | | | | |
| After PCT at 120° C. for 300 hours | Molecular weight | Viscosity number | ml/g | 51.2 | 44.7 | 46.0 | 48.8 | 42.8 | 43.2 |
| | | Viscosity-average molecular weight | Mv | 19,300 | 16,400 | 17,000 | 18,200 | 15,600 | 15,700 |
| | | | ΔMv | 2,200 | 1,900 | 2,200 | 2,300 | 6,500 | 5,700 |
| | | Molecular weight reduction ratio | % | 10 | 10 | 11 | 11 | 29 | 27 |
| | Automatic falling weight | −30° C. | J | 9.3 | 10.3 | 13.5 | 17.2 | 8.2 | 10.4 |
| | | Ductile fracture | Plates/total number of test plates | 2/20 | 14/20 | 18/20 | 20/20 | 5/20 | 6/20 |

TABLE 2-continued

| Processing stability | | | | | | | | |
|---|---|---|---|---|---|---|---|---|
| Retention test at 360° C. | Stationary molding Retention for 5 minutes | Suppressing effect on discoloration or the like | B | C | B | B | A | A |
| | | | B | C | C | B | A | A |
| | Retention for 10 minutes | | C | C | C | C | A | A |
| | Retention for 15 minutes | | C | C | C | C | A | A |
| | Retention for 20 minutes | | C | C | C | C | A | A |

| | | | | Comparative Example 7 | Comparative Example 8 | Comparative Example 9 | Comparative Example 10 | Comparative Example 11 | Comparative Example 12 |
|---|---|---|---|---|---|---|---|---|---|
| PC resin mixture (A) | Grade | Molecular weight | Amount of PDMS | | | | | | |
| PC-PDMS | SIPC-1 | 17,400 | 6.0 | 55.0 | 55.0 | 55.0 | | | |
| PC-PDMS | SIPC-2 | 17,400 | 6.2 | | | | 50.0 | 50.0 | 50.0 |
| PC | TARFLON FN1700A | 17,300 | 0.0 | | | | | | |
| PC | TARFLON FN1900A | 19,300 | 0.0 | | | | | | |
| PC | TARFLON FN2200A | 21,300 | 0.0 | | | | 20.0 | | |
| PC | TARFLON FN2500A | 24,200 | 0.0 | | | 22.0 | 30.0 | 40.0 | |
| PC | TARFLON FN2600A | 25,400 | 0.0 | 29.0 | 29.0 | 23.0 | | 10.0 | 42.0 |
| PC | NOVAREX 7030PJ | 29,300 | 0.0 | 16.0 | 16.0 | | | | 8.0 |
| Loading | Amount of PDMS | | | 3.3 | 3.3 | 3.3 | 3.1 | 3.1 | 3.1 |
| | Viscosity-average molecular weight of component (A) | | | 21,500 | 21,500 | 20,500 | 20,200 | 20,900 | 21,700 |

| Antioxidant (B) | Grade | — | | | | | | |
|---|---|---|---|---|---|---|---|---|
| Phosphite-based antioxidant | IRGAFOS 168 | | 0.025 | 0.025 | | 0.025 | 0.025 | 0.025 |
| Phosphine-based antioxidant | JC263 | | | | 0.05 | | | |

| Epoxidation stabilizer (C) | Grade | Oxirane oxygen concentration | | | | | | |
|---|---|---|---|---|---|---|---|---|
| CELLOXIDE | 2021P | — | | | 0.02 | | | |
| SANSO CIZER | E-PS | 3.40% | | | | | | |
| | E-6000 | 3.50% | 0.02 | 0.04 | | | | |

| | | | | Comparative Example 7 | Comparative Example 8 | Comparative Example 9 | Comparative Example 10 | Comparative Example 11 | Comparative Example 12 |
|---|---|---|---|---|---|---|---|---|---|
| | Evaluation before PCT | | | | | | | | |
| Before PCT | Molecular weight | Viscosity number | ml/g | 56.3 | 56.2 | 54.0 | 52.0 | 54.4 | 55.6 |
| | | Viscosity-average molecular weight | Mv | 21,500 | 21,500 | 20,500 | 19,600 | 20,700 | 21,200 |
| | Automatic falling weight | −30° C. Ductile fracture | J Plates/total number of test plates | 18.0 5/5 | 20.2 5/5 | 19.6 5/5 | 24.1 5/5 | 18.0 5/5 | 20.2 5/5 |
| | Flowability | MVR/300° C. | cc/10 min | 7.0 | 7.0 | 7.0 | 9.0 | 8.0 | 7.0 |
| | | Q value/280° C. | E-2 ml/sec | 4.9 | 4.9 | 4.9 | 7.0 | 5.6 | 5.0 |
| | Evaluation after PCT | | | | | | | | |
| After PCT at 120° C. for 300 hours | Molecular weight | Viscosity number | ml/g | 43.0 | 43.4 | 43.0 | 40.0 | 42.0 | 43.0 |
| | | Viscosity-average molecular weight | Mv | 15,700 | 15,800 | 15,700 | 14,300 | 15,200 | 15,700 |
| | | | ΔMv | 5,800 | 5,700 | 4,800 | 5,300 | 5,500 | 5,500 |
| | | Molecular weight reduction ratio | % | 27 | 27 | 23 | 27 | 27 | 26 |
| | Automatic falling weight | −30° C. Ductile fracture | J Plates/total number of test plates | 10.1 5/20 | 10.4 8/20 | 0.1 4/20 | 10.4 0/20 | 10.1 2/20 | 10.4 5/20 |

TABLE 2-continued

| | Processing stability | | | | | | | |
|---|---|---|---|---|---|---|---|---|
| Retention test at 360° C. | Stationary molding Retention for 5 minutes | Suppressing effect on discoloration or the like | A | A | A | A | A | A |
| | | | A | A | B | A | A | A |
| | Retention for 10 minutes | | A | A | C | A | A | A |
| | Retention for 15 minutes | | A | A | C | A | A | A |
| | Retention for 20 minutes | | A | A | C | A | A | A |

As can be seen from Table 1, the resin compositions of Examples 1 to 16 each containing a specific component are each excellent in impact resistance at low temperatures because the reduction ratio P of the viscosity-average molecular weight of each of the resin compositions after the pressure cooker test is 20% or less. In addition, each of the resin compositions has good processing stability because the resin composition undergoes an influence such as discoloration to a small extent even when the resin composition is retained at high temperatures for at least 15 minutes.

Meanwhile, as can be seen from Table 2, none of the resin compositions of Comparative Examples 1 to 4 contains the antioxidant (B) and hence the resin compositions are each poor in processing stability; specifically, the resin compositions each show discoloration when retained at high temperatures for at least about 10 minutes. In addition, the following result was obtained: the resin compositions of Comparative Examples 5 to 12 each involved a problem in terms of impact resistance at low temperatures as compared with those of Examples because the reduction ratio of the viscosity-average molecular weight of each of the resin compositions after the pressure cooker test exceeded 20%.

INDUSTRIAL APPLICABILITY

The polycarbonate resin composition of the present invention has such good processing stability that its discoloration or the like does not occur even when the resin composition is retained at high temperatures. In addition, a molded article formed of the resin composition can maintain its excellent impact resistance at low temperatures over a long time period even when repeatedly used under a high-temperature and high-humidity environment.

Thus, the molded body formed of the poly carbonate resin composition of the present invention suitably finds use in applications such as: a chocolate processing die or ice cream processing die to be washed with steam after being refrigerated and used, a container for storing frozen food, a processing pool for seafood, and a container to be used in a dish dryer, rice cooker, or the like; and industrial parts including an instrumentation box or junction box under a high-temperature and high-humidity environment, and an underground member in a cold district.

The invention claimed is:

1. A polycarbonate resin composition, comprising:
   100 parts by mass of an aromatic polycarbonate resin mixture (A) consisting of 5 to 100 mass % of an aromatic polycarbonate-polyorganosiloxane copolymer (A-1) and 95 to 0 mass % of an aromatic polycarbonate resin (A-2) except the component (A-1), the aromatic polycarbonate resin mixture (A) having a content of a polyorganosiloxane unit is 1 mass % or more,
   0.002 to 0.200 parts by mass of a phosphite-based antioxidant or a phosphine-based antioxidant (B) and
   0 to 0.200 parts by mass of an epoxidation stabilizer (C),
   wherein a reduction ratio P of a viscosity-average molecular weight of the polycarbonate resin composition calculated from the calculation equation (I) is 20% or less:

$$P\,[\%] = (M_1 - M_2)/M_1 \times 100 \qquad \text{calculation equation (I):}$$

wherein
   $M_1$ represents a viscosity-average molecular weight of the polycarbonate resin composition measured after the resin composition is pelletized,
   $M_2$ represents a viscosity-average molecular weight of the resin composition after a pressure cooker test measured after the pellet is loaded into a pressure cooker tester set to 121° C. and is treated for 300 hours, and
   P represents the reduction ratio of the viscosity-average molecular weight of the resin composition after the pressure cooker test to the viscosity-average molecular weight of the resin composition before the test,
   wherein the polycarbonate resin composition satisfies (i), (ii) or (iii), and satisfies (iv):
   (i) the phosphorus-based antioxidant (B) is a phosphite-based antioxidant and a content of the phosphite-based antioxidant as component (B) with respect to 100 parts by mass of the component (A) is from 0.020 to 0.200 parts by mass, and a content of the component (C) with respect to 100 parts by mass of component (A) is more than 0 parts by mass and 0.200 parts by mass or less, or
   (ii) the phosphorus-based antioxidant (B) is a phosphite-based antioxidant and the resin composition is substantially free of component (C), and a content of the phosphite-based antioxidant as component (B) is 0.002 parts by mass or more and less than 0.020 parts by mass with respect to 100 parts by mass of component (A), or
   (iii) the phosphorus-based antioxidant (B) is a phosphine-based antioxidant and the resin composition is substantially free of component (C), and a content of the phosphine-based antioxidant as component (B) is from 0.002 to 0.200 parts by mass with respect to 100 parts by mass of component (A), and
   (iv) after the pressure cooker test, 20 test plates were produced with the polycarbonate resin composition, and after performing low-temperature falling weight impact test according to JIS K 7211-2 on the 20 test plates, the number of test plates that exhibited ductile fracture is 14 or more.

2. The polycarbonate resin composition according to claim 1, wherein the viscosity-average molecular weight of the resin composition after the pressure cooker test represented by the $M_2$ in the calculation equation (I) is 16,000 or more.

3. The polycarbonate resin composition according to claim 1, wherein
the phosphorus-based antioxidant (B) is a phosphite-based antioxidant and the resin composition is substantially free of component (C), and
component (B) comprises 0.002 parts by mass or more and less than 0.018 parts by mass with respect to 100 parts by mass of component (A).

4. The polycarbonate resin composition according to claim 1, wherein
the phosphorus-based antioxidant (B) is a phosphite-based antioxidant and a content of the phosphite-based antioxidant as the component (B) with respect to 100 parts by mass of the component (A) is from 0.020 to 0.200 parts by mass, and
a content of component (C) with respect to 100 parts by mass of the component (A) is from 0.002 parts by mass to 0.200 parts by mass or less.

5. The polycarbonate resin composition according to claim 1, wherein the epoxidation stabilizer (C) comprises at least one member selected from the group consisting of 3,4-epoxycyclohexenylmethyl-3',4'-epoxycyclohexene carboxylate and a 1,2-epoxy-4-(2-oxiranyl)cyclohexane adduct of 2,2-bis(hydroxymethyl)-1-butanol.

6. The polycarbonate resin composition according to claim 1, wherein the epoxidation stabilizer (C) is an epoxidized natural oil having an oxirane oxygen concentration of 4% or more, or an epoxidized synthetic oil having an oxirane oxygen concentration of 4% or more.

7. A molded article, obtained by molding the polycarbonate resin composition of claim 1.

8. The polycarbonate resin composition of claim 1, wherein
a reduction ratio P of a viscosity-average molecular weight of the polycarbonate resin composition calculated from calculation equation (I) is 16% or less.

9. The polycarbonate resin composition of claim 1 wherein A-1 comprises from 50 to 90% of component A and A-2 comprises from 10 to 50% of component A.

10. The polycarbonate resin composition of claim 1 wherein the polyorganosiloxane component of A-1 comprises from 3 to 15% of component A.

11. The polycarbonate resin composition of claim 1, further comprising an additive, wherein said additive is at least one member selected from the group consisting of a reinforcing material, a filler, a stabilizer, an antioxidant, a UV absorber, an antistatic agent, a lubricant, a releasing agent, a dye, a pigment, a flame retardant, and an elastomer for improving impact resistance.

12. The polycarbonate resin composition according to claim 1, wherein the viscosity-average molecular weight of the aromatic polycarbonate-polyorganosiloxane copolymer (A-1) is from 14,000 to 50,000.

13. The polycarbonate resin composition according to claim 1, wherein a content of the polyorganosiloxane unit is from 1 to 30 mass % in the aromatic polycarbonate-polyorganosiloxane copolymer (A-1).

14. The polycarbonate resin composition according to claim 1, wherein
(iv) after the pressure cooker test, 20 test plates were produced with the polycarbonate resin composition, and after performing low-temperature falling weight impact test according to JIS K 7211-2 on the 20 test plates, the number of test plates that exhibited ductile fracture is 17 or more.

\* \* \* \* \*